United States Patent
Ma et al.

(10) Patent No.: US 10,960,650 B2
(45) Date of Patent: Mar. 30, 2021

(54) POLY(VINYL ACETAL) RESIN COMPOSITIONS, LAYERS, AND INTERLAYERS HAVING ENHANCED PROPERTIES

(71) Applicant: Solutia Inc., St. Louis, MO (US)

(72) Inventors: Yinong Ma, Longmeadow, MA (US); Nandan Ukidwe, Suffield, CT (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 16/524,286

(22) Filed: Jul. 29, 2019

(65) Prior Publication Data
US 2019/0381772 A1 Dec. 19, 2019

Related U.S. Application Data

(63) Continuation of application No. 15/648,534, filed on Jul. 13, 2017, now Pat. No. 10,391,749, which is a continuation of application No. 14/562,865, filed on Dec. 8, 2014, now Pat. No. 9,724,899.

(51) Int. Cl.

| | | |
|---|---|---|
| B32B 27/22 | (2006.01) |
| B32B 27/08 | (2006.01) |
| B29B 11/14 | (2006.01) |
| B32B 7/02 | (2019.01) |
| B32B 27/30 | (2006.01) |
| B32B 17/10 | (2006.01) |
| B32B 37/14 | (2006.01) |
| B32B 37/18 | (2006.01) |
| B29L 11/00 | (2006.01) |
| B29L 31/00 | (2006.01) |
| B29K 29/00 | (2006.01) |
| B29K 629/00 | (2006.01) |
| B32B 37/00 | (2006.01) |

(52) U.S. Cl.
CPC .............. *B32B 27/08* (2013.01); *B29B 11/14* (2013.01); *B32B 7/02* (2013.01); *B32B 17/10605* (2013.01); *B32B 17/10761* (2013.01); *B32B 27/22* (2013.01); *B32B 27/306* (2013.01); *B29K 2029/14* (2013.01); *B29K 2629/14* (2013.01); *B29L 2011/00* (2013.01); *B29L 2031/768* (2013.01); *B32B 37/003* (2013.01); *B32B 37/144* (2013.01); *B32B 37/182* (2013.01); *B32B 2250/02* (2013.01); *B32B 2250/246* (2013.01); *B32B 2307/102* (2013.01); *B32B 2307/308* (2013.01); *B32B 2307/416* (2013.01); *B32B 2307/418* (2013.01); *B32B 2307/558* (2013.01); *B32B 2307/56* (2013.01); *B32B 2309/68* (2013.01); *B32B 2315/08* (2013.01); *B32B 2329/00* (2013.01); *B32B 2419/00* (2013.01); *B32B 2457/12* (2013.01); *B32B 2551/00* (2013.01); *B32B 2571/00* (2013.01); *B32B 2605/08* (2013.01)

(58) Field of Classification Search
CPC ....... B32B 27/30; B32B 27/306; B32B 27/22; B32B 17/10761; B32B 37/144; B32B 7/02

See application file for complete search history.

(56) References Cited

U.S. PATENT DOCUMENTS

| | | |
|---|---|---|
| 2,282,026 A | 5/1942 | Bren et al. |
| 2,282,057 A | 5/1942 | Hopkins et al. |
| 5,190,826 A | 3/1993 | Asahina et al. |
| 5,290,660 A | 3/1994 | Elan et al. |
| 5,340,654 A | 8/1994 | Ueda et al. |
| 5,728,472 A | 3/1998 | D'Errico |
| 7,563,516 B2 | 7/2009 | Matsudo |
| 8,470,908 B2 | 6/2013 | Frank |
| 8,597,792 B2 | 12/2013 | Meise et al. |
| 9,669,605 B2 | 6/2017 | Ukidwe et al. |
| 9,724,899 B2 | 8/2017 | Ma et al. |
| 9,758,662 B2 | 9/2017 | Ma et al. |
| 9,926,431 B2 | 3/2018 | Ukidwe et al. |
| 9,976,024 B2 | 5/2018 | Ma et al. |
| 10,391,749 B2 | 8/2019 | Ma et al. |
| 2004/0065229 A1 | 4/2004 | Papenfuhs et al. |
| 2005/0170160 A1 | 8/2005 | Moran et al. |
| 2008/0268270 A1 | 10/2008 | Chen et al. |
| 2008/0286542 A1 | 11/2008 | Hayes et al. |
| 2009/0011230 A1 | 1/2009 | Rymer et al. |
| 2009/0087669 A1 | 4/2009 | Hayes et al. |
| 2011/0076459 A1 | 3/2011 | Lu et al. |
| 2012/0263958 A1 | 10/2012 | Iwamoto et al. |

(Continued)

FOREIGN PATENT DOCUMENTS

| | | |
|---|---|---|
| DE | 10343385 | 4/2005 |
| EP | 2330090 A1 | 6/2011 |

(Continued)

OTHER PUBLICATIONS

Wade, E.B., Vinyl Acetal Polymers, in the Encyclopedia of Polymer Science & Technology, 3rd ed., vol. 8, pp. 381-399, 2003.

(Continued)

*Primary Examiner* — Kuo Liang Peng
(74) *Attorney, Agent, or Firm* — Michael K. Carrier; Steven A. Owen

(57) ABSTRACT

Resin compositions, layers, and interlayers comprising a poly(vinyl acetal) resin that includes residues of an aldehyde other than n-butyraldehyde are provided. Such compositions, layers, and interlayers can exhibit enhanced or optimized properties as compared to those formulated with comparable poly(vinyl n-butyral) resins.

20 Claims, 6 Drawing Sheets

(56) References Cited

U.S. PATENT DOCUMENTS

| | | | |
|---|---|---|---|
| 2013/0022824 A1* | 1/2013 | Meise | B32B 17/10761 428/441 |
| 2013/0022825 A1 | 1/2013 | Meise et al. | |
| 2013/0148263 A1 | 6/2013 | Shimazumi et al. | |
| 2013/0189527 A1 | 7/2013 | Meise et al. | |
| 2013/0236711 A1 | 9/2013 | Lu | |
| 2013/0323516 A1 | 12/2013 | Shimamoto et al. | |
| 2014/0138580 A1 | 5/2014 | Mizumura et al. | |
| 2014/0364550 A1 | 12/2014 | Lu | |
| 2016/0159051 A1 | 6/2016 | Lu et al. | |
| 2018/0186969 A1 | 7/2018 | Ukidwe et al. | |

FOREIGN PATENT DOCUMENTS

| | | |
|---|---|---|
| EP | 2623471 A1 | 8/2013 |
| EP | 2623472 A1 | 8/2013 |
| EP | 2623473 A1 | 8/2013 |
| EP | 2623474 A1 | 8/2013 |
| EP | 2759527 A1 | 7/2014 |
| WO | WO 96/14985 A1 | 5/1996 |

OTHER PUBLICATIONS

PCT International Search Report and Written Opinion dated Mar. 15, 2016 for International Application No. PCT/US2015/063877.
PCT International Search Report and Written Opinion dated Apr. 22, 2016 for International Application No. PCT/US2015/063897.
USPTO Office Action dated Jan. 2, 2020 received in co-pending U.S. Appl. No. 15/904,862.
USPTO Notice of Allowance dated Apr. 22, 2020 received in co-pending U.S. Appl. No. 15/904,862.

\* cited by examiner

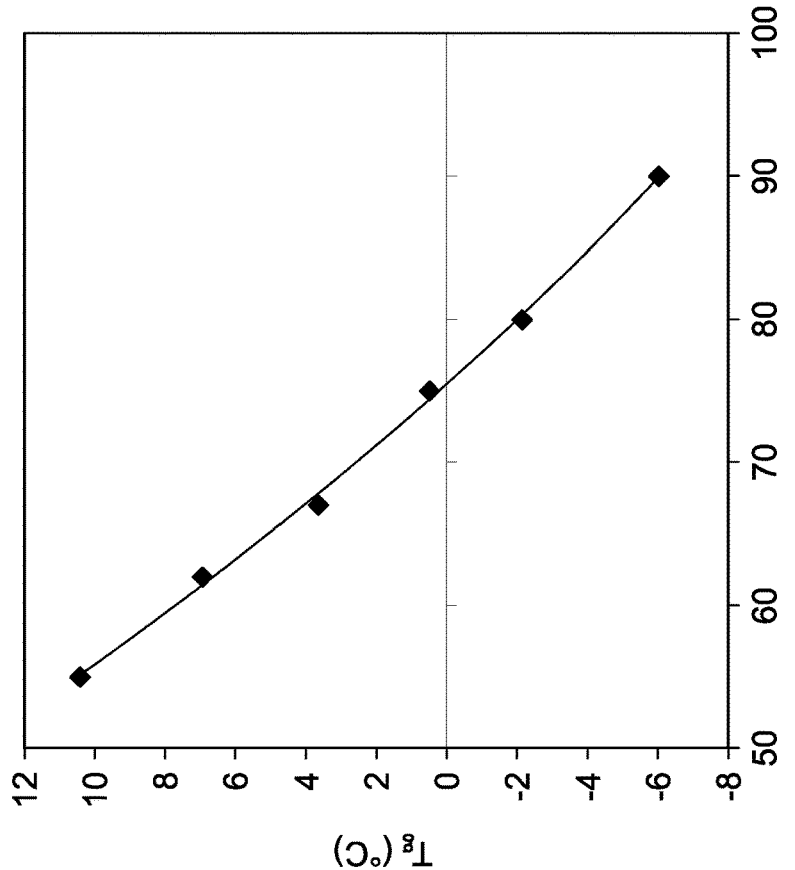
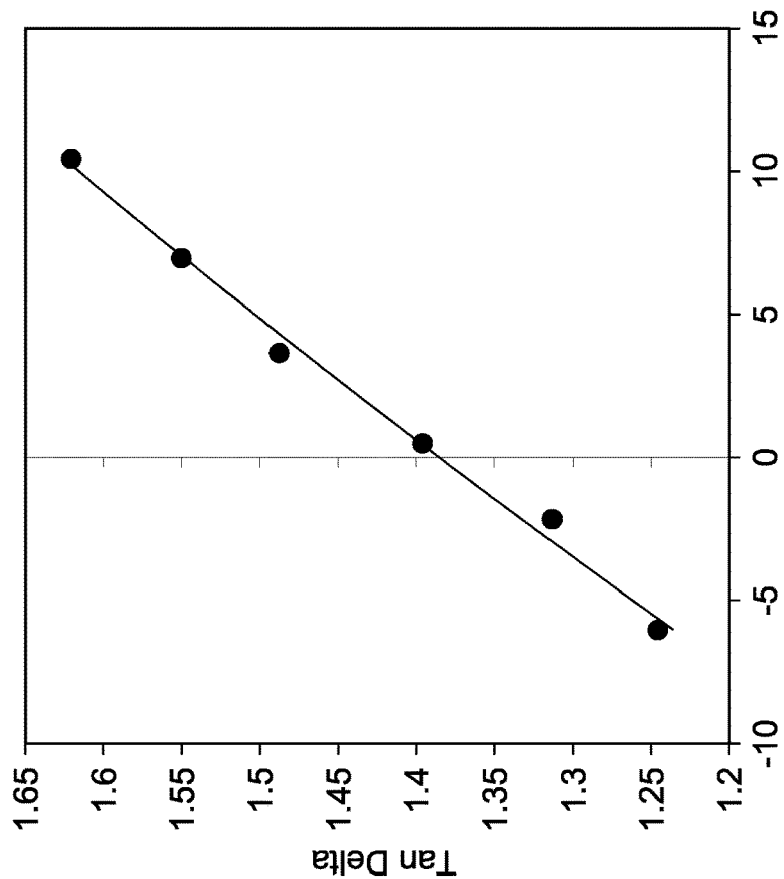
FIG. 6a
FIG. 6b

POLY(VINYL ACETAL) RESIN COMPOSITIONS, LAYERS, AND INTERLAYERS HAVING ENHANCED PROPERTIES

CROSS REFERENCE TO RELATED APPLICATION(S)

This application is a continuation of U.S. patent application Ser. No. 15/648,534 filed Jul. 13, 2017, which was a continuation of U.S. patent application Ser. No. 14/562,865, filed Dec. 8, 2014 now U.S. Pat. No. 9,724,899, the disclosures of all which are hereby incorporated by reference herein.

BACKGROUND

1. Field of the Invention

This disclosure relates to polymer resins and, in particular, to polymer resins suitable for use in polymer interlayers, including those utilized in multiple layer panels.

2. Description of Related Art

Poly(vinyl butyral) (PVB) is often used in the manufacture of polymer sheets that can be used as interlayers in multiple layer panels, including, for example, light-transmitting laminates such as safety glass or polymeric laminates. PVB is also used in photovoltaic solar panels to encapsulate the panels which are used to generate and supply electricity for commercial and residential applications.

Safety glass generally refers to a transparent laminate that includes at least one polymer sheet, or interlayer, disposed between two sheets of glass. Safety glass is often used as a transparent barrier in architectural and automotive applications, and one of its primary functions is to absorb energy resulting from impact or a blow without allowing penetration of the object through the glass and to keep the glass bonded even when the applied force is sufficient to break the glass. This prevents dispersion of sharp glass shards, which minimizes injury and damage to people or objects within an enclosed area. Safety glass may also provide other benefits, such as a reduction in ultraviolet (UV) and/or infrared (IR) radiation, and it may also enhance the aesthetic appearance of window openings through addition of color, texture, and the like. Additionally, safety glass with desirable sound insulation properties has also been produced, which results in quieter internal spaces.

Poly(vinyl acetal) resins typically include acetate pendant groups, hydroxyl pendant groups, and aldehyde pendant groups, such as n-butyraldehyde groups for a PVB resin, that are present along the vinyl polymer backbone. Properties of poly(vinyl acetal) resins are determined, in part, by the relative amount of hydroxyl, acetate, and aldehyde groups and/or by the type and amount of plasticizer added to the resin. Therefore, selection of certain resin compositions and combination of those resins with various types and amount of plasticizers, can provide resin compositions, layers, and interlayers having different properties.

However, such selections can have various drawbacks. For example, PVB resin compositions having high residual hydroxyl contents and low plasticizer contents tend to have higher glass transition temperatures, which make such resins desirable in safety performance applications. However, these resins exhibit very poor vibration dampening and sound attenuation performance. Similarly, PVB resin compositions having lower residual hydroxyl contents and higher amounts of plasticizer may exhibit good vibration and sound dampening properties, but typically have limited, if any, impact resistance over a broad temperature range.

Thus, a need exists for polymer resins that exhibit multiple desirable properties and that have mechanical, optical, and/or acoustic properties that can be adjusted as needed so that the resin can be utilized in a wide variety of applications. Additionally, a need exists for resin compositions, layers, and interlayers including such resins, which can be employed in several end uses, including in safety glass and as polymeric laminates.

SUMMARY

One embodiment of the present invention concerns an interlayer comprising a first resin layer comprising a first poly(vinyl acetal) resin and a first plasticizer; and a second resin layer adjacent to the first resin layer, wherein the second resin layer comprises a second poly(vinyl acetal) resin and a second plasticizer, wherein the second plasticizer is present in the second resin layer in an amount of at least 50 parts per hundred parts of resin (phr) and wherein the difference between the amount of the first plasticizer in the first resin layer and the amount of the second plasticizer in the second resin layer is more than 10 phr, wherein at least one of the first and the second poly(vinyl acetal) resins comprises at least 5 weight percent of residues of an aldehyde other than n-butyraldehyde, based on the total weight of aldehyde residues of the first or the second poly(vinyl acetal) resin, and wherein the glass transition temperature of the first resin layer is at least 3° C. higher than the glass transition temperature of the second resin layer, and wherein the absolute value of the difference between the refractive index of the first resin layer and the refractive index of the second resin layer is not more than 0.010.

Another embodiment of the present invention concerns an interlayer comprising a first resin layer comprising a first poly(vinyl acetal) resin and a first plasticizer; and a second resin layer adjacent to the first resin layer, the second resin layer comprising a second poly(vinyl acetal) resin and a second plasticizer, wherein the interlayer meets at least one of the following criteria (i) through (iii): (i) the first poly (vinyl acetal) resin comprises at least 5 weight percent of residues of i-butyraldehyde, based on the total weight of aldehyde residues of the first poly(vinyl acetal) resin, and the second poly(vinyl acetal) resin comprises at least 10 weight percent of residues of an aldehyde having 6 or fewer carbon atoms, based on the total weight of aldehyde residues of the second poly(vinyl acetal) resin, wherein the refractive index of the first resin layer is at least 0.002 lower than the refractive index of a comparable poly(vinyl n-butyral) resin layer, and wherein the residual hydroxyl content of the second poly(vinyl acetal) resin is not more than 12 weight percent and the difference between the residual hydroxyl content of the first poly(vinyl acetal) resin and the residual hydroxyl content of the second poly(vinyl acetal) resin is at least 2 weight percent; (ii) the first poly(vinyl acetal) resin comprises at least 5 weight percent of residues of i-butyraldehyde, based on the total weight of aldehyde residues of the first poly(vinyl acetal) resin, and the second poly(vinyl acetal) resin comprises at least 10 weight percent of residues of an aldehyde having more than 6 carbon atoms, based on the total weight of aldehyde residues of the second poly (vinyl acetal) resin, wherein the residual hydroxyl content of the second poly(vinyl acetal) resin is at least 0.25 percent higher than the residual hydroxyl content of the first poly (vinyl acetal) resin, and wherein the amount of the second plasticizer in the second resin layer is at least 10 parts per hundred resin (phr) higher than the amount of the first plasticizer in the first resin layer; and (iii) neither of the first and the second poly(vinyl acetal) resins comprise residues of i-butyraldehyde and the second resin layer has a glass transition temperature that is at least 3° C. lower than the glass transition temperature of a comparable poly(vinyl n-butyral) resin layer.

Yet another embodiment of the present invention concerns a method of making an interlayer, said method comprising the steps of forming a first resin layer from a first poly(vinyl acetal) resin and a first plasticizer; forming a second resin layer from a second poly(vinyl acetal) resin and a second plasticizer; and producing said interlayer using said first resin layer and said second resin layer, wherein said first resin layer is adjacent to said second resin layer in said interlayer, wherein the glass transition temperature of said first resin layer is at least 3° C. higher than the glass transition temperature of said second resin layer, and wherein the difference between the refractive index of said first resin layer and the refractive index of said second resin layer is not more than 0.010.

DESCRIPTION OF THE DRAWINGS

Various embodiments of the present invention are described in detail below with reference to the attached drawing Figures, wherein:

FIG. 6a is a graph depicting the glass transition temperature of several plasticized resins described in Example 10 as a function of plasticizer loading; and FIG. 6b is a graph depicting the tan delta of the resin compositions described in Example 10 and shown in FIG. 6a as a function of glass transition temperature.

DETAILED DESCRIPTION

Figure 1:
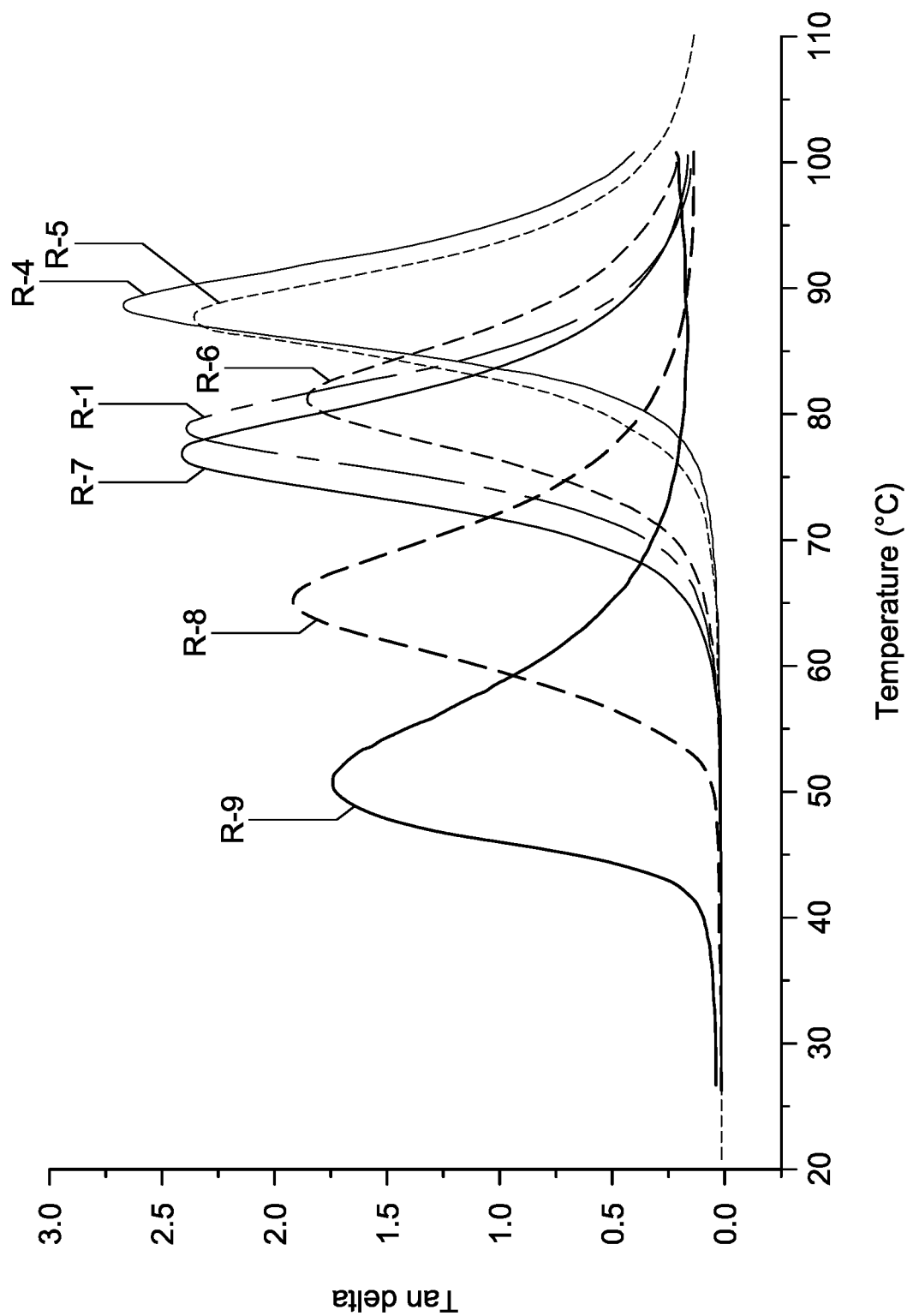
FIG. 1 is a graph depicting the tan delta of several plasticized poly(vinyl acetal) resins described in Example 1, over a temperature range of 30° C. to 110° C.

The present invention relates to polymer resin compositions, layers, and interlayers that include at least one poly (vinyl acetal) resin that exhibits different properties than a conventional poly(vinyl n-butyral) (PVB) resin, but that can be used in many of the same applications as PVB, including, for example, safety glass applications. Compositions, layers, and interlayers according to various embodiments of the present invention may have different glass transition temperatures, different refractive indices, and/or different viscosities than comparable poly(vinyl acetal) resins that only include residues of n-butyraldehyde. As a result, the resins, compositions, layers, and interlayers described herein may also exhibit enhanced optical, mechanical, and/or acoustic performance. Methods for producing compositions, layers, and interlayers having optimized properties according to various embodiments of the present invention are also described herein.

As used herein, the terms "polymer resin composition" and "resin composition" refer to compositions that include one or more polymer resins. Polymer compositions may optionally include other components, such as plasticizers and/or other additives. As used herein, the terms "polymer resin layer" and "resin layer" refer to one or more polymer resins, optionally combined with one or more plasticizers, that have been formed into a polymeric sheet. Again, resin layers may include one or more additional additives. As used herein, the term "interlayer" refers to a single or multiple layer polymer sheet suitable for use with at least one rigid substrate to form a multiple layer panel. The terms "single-sheet" and "monolithic" interlayer refer to interlayers formed of one single resin sheet, while the terms "multiple layer" and "multilayer" interlayer refer to interlayers having two or more resin sheets that are coextruded, laminated, or otherwise coupled to one another.

Resin compositions, layers, and interlayers according to various embodiments of the present invention can include at least one poly(vinyl acetal) resin. Poly(vinyl acetal) resins can be formed by aqueous or solvent-based acetalization of poly(vinyl alcohol) with one or more aldehydes in the presence of an acid catalyst. The resulting resin can then be separated, stabilized, and dried according to known methods such as, for example, those described in U.S. Pat. Nos. 2,282,057 and 2,282,026, as well as "Vinyl Acetal Polymers," in the *Encyclopedia of Polymer Science & Technology*, 3$^{rd}$ ed., Volume 8, pages 381-399, by B. E. Wade (2003). The total amount of residual aldehyde groups, or residues, present in the resulting poly(vinyl acetal) resin can be at least about 50, at least about 60, at least about 70, at least about 75, at least about 80, at least about 85, at least about 90, at least about 92 weight percent, as measured by ASTM D-1396. The total amount of aldehyde residues in a poly(vinyl acetal) resin can be collectively referred to as the acetal component, with the balance of the poly(vinyl acetal) resin comprising residual hydroxyl or acetate groups, which will be discussed in further detail below.

When the poly(vinyl acetal) resin is a poly(vinyl n-butyral) (PVB) resin, greater than 90, at least about 95, at least about 97, or at least about 99 percent, by weight, of the acetal component, or total aldehyde residues, can comprise residues of n-butyraldehyde. Additionally, a poly(vinyl n-butyral) resin may comprise less than 10, not more than about 5, not more than about 2, not more than about 1, or not more than about 0.5 weight percent of residues of an aldehyde other than n-butyraldehyde, based on the total weight of aldehyde residues of that resin.

Compositions, layers, and interlayers according to embodiments of the present invention can include at least one poly(vinyl acetal) resin that comprises at least about 10 weight percent of residues of an aldehyde other than n-butyraldehyde. In some embodiments, the poly(vinyl acetal) resin may include at least about 15, at least about 20, at least about 30, at least about 40, at least about 50, at least about 60, at least about 70, at least about 80, at least about 90, at least about 95, or at least about 99 weight percent of residues of an aldehyde other than n-butyraldehyde, based on the total weight of aldehyde residues of the poly(vinyl acetal) resin. This resin may also include not more than about 10, not more than about 5, not more than about 2, or not more than about 1 weight percent of residues of n-butyraldehyde, based on the total weight of aldehyde residues of the poly(vinyl acetal) resin.

When the poly(vinyl acetal) resin includes residues of one or more aldehydes other than n-butyraldehyde, any suitable aldehyde can be used. In some embodiments, the aldehyde other than n-butyraldehyde can comprise, for example, an aldehyde having between 3 and 12 carbon atoms per molecule (i.e., a $C_3$ to $C_{12}$ aldehyde), an aldehyde having between 4 and 10 carbon atoms per molecule (i.e., a $C_4$ to $C_{10}$ aldehyde), or an aldehyde having between 4 and 8 carbon atoms per molecule (i.e., a $C_4$ to $C_8$ aldehyde), except n-butyraldehyde. In some embodiments, the aldehyde can include 8 or fewer carbon atoms per molecule, 6 or fewer carbon atoms per molecule, or 4 or fewer carbon atoms per molecule. In other embodiments, the aldehyde can have more than 4 carbon atoms per molecule, more than 5 carbon atoms per molecular, or more than 6 carbon atoms per molecule.

The aldehyde other than n-butyraldehyde may be an aliphatic aldehyde and can be either a branched or a straight chain molecule. Examples of suitable aldehydes other than n-butyraldehyde can include, but are not limited to, i-butyraldehyde, 2-methylvaleraldehyde, n-hexyl aldehyde, 2-ethylhexyl aldehyde, n-octyl aldehyde, and combinations thereof. In some embodiments, the aldehyde other than n-butyraldehyde can be selected from the group consisting of i-butyraldehyde, 2-methylbutyraldehyde, 2-ethylhexyl aldehyde, and combinations thereof, while, in some embodiments, the aldehyde other than n-butyraldehyde can be selected from the group consisting of i-butyraldehyde, 2-ethylhexyl aldehyde, and combinations thereof.

According to various embodiments, the resin composition, layer, or interlayer may also include a poly(vinyl acetal) resin comprising residues of n-butyraldehyde. In some embodiments, these residues of n-butyraldehyde may be present in the same resin having residues of an aldehyde other than n-butyraldehyde, thereby forming a single "hybrid" resin with multiple aldehyde residues. In other embodiments, the n-butyraldehyde residues may be present on a second poly(vinyl acetal) resin physically blended with the first poly(vinyl acetal) resin that includes residues of an aldehyde other than n-butyraldehyde, and the blend can be present in the composition, layer, or interlayer. Typically, for every blend of resins, an equivalent single hybrid poly(vinyl acetal) resin also exists that may be substituted for the blend with similar results.

When the composition, layer, or interlayer includes a single hybrid resin having residues of different aldehydes, the residues of the aldehyde other than n-butyraldehyde and the residues of n-butyraldehyde may each be present in the resin in an amount of at least about 1, at least about 2, at least about 5, at least about 10, at least about 15, at least about 20, at least about 25, at least about 30, at least about 35, at least about 40, or at least about 45 percent, based on the total weight of the aldehyde residues of the single resin. The combined amount of these two residues can comprise at least about 40, at least about 50, at least about 60, at least about 70, at least about 80, or at least about 90 percent of the total weight of the aldehyde residues of the resin. In some embodiments, the ratio, by weight, of residues of the aldehyde other than n-butyraldehyde to the n-butyraldehyde residues can be at least about 1:99, at least about 5:95, at least about 10:90, at least about 15:85, at least about 25:75, at least about 30:70, at least about 40:60 and/or not more than about 99:1, not more than about 95:5, not more than about 90:10, not more than about 85:15, not more than about 75:25, not more than about 70:30, not more than about 60:40, or in the range of from about 1:99 to about 99:1, about 5:95 to about 95:5, about 10:90 to about 90:10, about 15:85 to about 85:15, about 25:75 to about 75:25, about 30:70 to about 70:30, or about 40:60 to about 60:40, or the residues of the aldehyde other than n-butyraldehyde can be present in the poly(vinyl acetal) resin in an amount of at least about 1, at least about 5, at least about 10, at least about 15, at least about 25, at least about 30, or at least about 40 weight percent, based on the combined weight of the residues of the aldehyde other than n-butyraldehyde and the residues of n-butyraldehyde.

Similarly, when the composition, layer, or interlayer comprises a physical blend of a first poly(vinyl acetal) resin comprising residues of an aldehyde other than n-butyraldehyde and a second poly(vinyl acetal) resin comprising residues of n-butyraldehyde, each of the poly(vinyl acetal) resins may be present in the composition, layer, or interlayer in an amount of at least about 1, at least about 2, at least about 5, at least about 10, at least about 15, at least about 20, at least about 30, at least about 40, or at least about 45 weight percent, based on the total weight of the resins in the composition. Together, the combined amount of the first and second poly(vinyl acetal) resins can make up at least about 40, at least about 50, at least about 60, at least about 70, at least about 80, or at least about 90 percent of the total weight of the resins in the composition, layer, or interlayer.

When the resin composition, layer, or interlayer includes a blend of a first and a second poly(vinyl acetal) resin, the ratio, by weight, of the first poly(vinyl acetal) resin to the second poly(vinyl acetal) resin can be in the range of from about 1:99 to 99:1, about 5:95 to 95:5, about 10:90 to 90:10, about 15:85 to 85:15, about 25:75 to 75:25, about 30:70 to 70:30, or about 40:60 to 60:40. In some embodiments, the first poly(vinyl acetal) resin, which can include residues of an aldehyde other than n-butyraldehyde, can be present in the composition, layer, or interlayer in an amount of at least about 1, at least about 5, at least about 10, at least about 15, at least about 25, at least about 30, or at least about 40 weight percent, based on the combined weight of the first and second resins.

In addition to residues of one or more aldehydes, the poly(vinyl acetal) resins described herein may also include residual hydroxyl and/or residual acetate groups. As used herein, the terms "residual hydroxyl content" and "residual acetate content" refer to the amount of polyvinyl hydroxyl and polyvinyl acetate groups, respectively, that remain on a resin after processing is complete. For example, poly(vinyl n-butyral) can be produced by hydrolyzing poly(vinyl acetate) to poly(vinyl alcohol), and then acetalizing the poly(vinyl alcohol) with n-butyraldehyde to form poly(vinyl n-butyral). In the process of hydrolyzing the poly(vinyl acetate), not all of the acetate groups are converted to hydroxyl groups, and residual acetate groups remain on the resin. Similarly, in the process of acetalizing the poly(vinyl alcohol), not all of the hydroxyl groups are converted to acetal groups, which also leaves residual hydroxyl groups on the resin. As a result, most poly(vinyl acetal) resins include both residual hydroxyl groups (as vinyl hydroxyl, PVOH, groups) and residual acetate groups (as vinyl acetate, PVAc, groups) as part of the polymer chain. The residual hydroxyl content and residual acetate content are expressed in weight percent, based on the weight of the polymer resin, and are measured according to ASTM D-1396.

In various embodiments, one or more of the poly(vinyl acetal) resins present in a composition, layer, or interlayer may have a residual hydroxyl content of at least about 14, at least about 14.5, at least about 15, at least about 15.5, at least about 16, at least about 16.5, at least about 17, at least about 17.5, at least about 18, at least about 18.5, at least about 19, at least about 19.5 and/or not more than about 45, not more than about 40, not more than about 35, not more than about 33, not more than about 30, not more than about 27, not more than about 25, not more than about 23, not more than about 22, not more than about 21.5, not more than about 21, not more than about 20.5, not more than about 20, not more than about 19.5, not more than about 19, not more than about 18.7 weight percent, measured as described previously. The residual hydroxyl content can be in the range of from about 14 to about 45, about 16 to about 30, about 18 to about 25, about 18.5 to about 20, or about 19.5 to about 21 weight percent.

In some embodiments, at least one poly(vinyl acetal) resin can have a residual hydroxyl content of at least about 8, at least about 8.5, at least about 9, at least about 9.5 weight percent and/or not more than about 13, not more than about 12.5, not more than about 12, not more than about 11.5, not more than about 11, not more than about 10.5, not more than about 10, not more than about 9.5, or not more than about 9 weight percent, or in the range of from about 8 to about 13, about 9 to about 12, or about 9.5 to about 11.5 weight percent.

When two or more poly(vinyl acetal) resins are present in a resin composition, layer, or interlayer as described herein, one or more of the resins can have a residual hydroxyl content different from the residual hydroxyl content of one or more of the other resins. For example, when a resin composition, layer, or interlayer includes a first poly(vinyl acetal) resin and a second poly(vinyl acetal) resin, at least one of the resins can have a residual hydroxyl content that is at least 2 weight percent different than the other. One or both resins can include residues of an aldehyde other than n-butyraldehyde as described previously. As used herein, the terms "weight percent different" and "the difference . . . is at least . . . weight percent" refer to a difference between two given weight percentages, calculated by subtracting one number from the other number. For example, a poly(vinyl acetal) resin having a residual hydroxyl content of 12 weight percent and a poly(vinyl acetal) resin having a residual hydroxyl content of 14 weight percent have a weight percent difference of 2. As used herein, the term "different" encompasses values that are both higher and lower than another value.

According to some embodiments, the residual hydroxyl content of one poly(vinyl acetal) resin can be at least about 3, at least about 4, at least about 6, or at least about 8 weight percent higher or lower than the residual hydroxyl content of another. In some embodiments, the difference between the residual hydroxyl content of one of the poly(vinyl acetal) resins and the residual hydroxyl content of another of the poly(vinyl acetal) resins in the compositions, layers, and interlayers described herein can be at least about 10, at least about 12, at least about 15, at least about 20, or at least about 30 weight percent.

When a resin composition, layer, or interlayer comprises two poly(vinyl acetal) resins having different residual acetate contents, the difference in residual acetate contents between two of the resins can be at least about at least about 2, at least about 4, at least about 6, at least about 8, at least about 10, at least about 12 and/or not more than about 30, not more than about 20, not more than about 15, or not more than about 10 weight percent, or the difference can be in the range of from about 2 to about 30, about 4 to about 20, about 6 to about 15, or about 8 to about 10 weight percent. For example, in some embodiments, at least one of the poly (vinyl acetal) resins described herein can have a residual acetate content of not more than about 4, not more than about 3, not more than about 2, or not more than about 1 weight percent, measured as described previously. In some embodiments, at least another of the poly(vinyl acetal) resins may have a residual acetate content of at least about 8, at least about 10, at least about 12, at least about 14, at least about 16, at least about 18, or at least about 20 weight percent.

In some embodiments, when the resin composition, layer, or interlayer includes a physical blend of resins, the first and second poly(vinyl acetal) resins may be blended such that one of the first and second poly(vinyl acetal) resins is dispersed within the other of the first and second poly(vinyl acetal) resins, which can form domains of one of the first and second poly(vinyl acetal) resins within the other of the first and second poly(vinyl acetal) resins. Such a blended resin may be used as a single layer interlayer or it may be combined with one or more adjacent layers to form a multilayer interlayer. In other embodiments, the first and second poly(vinyl acetal) resins can be present in adjacent layers of a multilayer interlayer, such that one of the layers of the interlayer includes the first poly(vinyl acetal) resin and another layer of the interlayer includes the second poly(vinyl acetal) resin. Additional layers can also be present adjacent to at least one of the layers.

The resin compositions, layers, and interlayers according to various embodiments of the present invention can further include at least one plasticizer. Depending on the specific composition of the resin or resins in a composition, layer, or interlayer, the plasticizer may be present in an amount of at least about 5, at least about 10, at least about 15, at least about 20, at least about 25, at least about 30, at least about 35, at least about 40, at least about 42, at least about 45, at least about 50, at least about 55, at least about 60, at least about 65, at least about 70 parts per hundred parts of resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, or not more than about 40 phr, or in the range of from about 5 to about 120, about 10 to about 110, about 20 to about 90, or about 25 to about 75 phr.

As used herein, the term "parts per hundred parts of resin" or "phr" refers to the amount of plasticizer present as compared to one hundred parts of resin, on a weight basis. For example, if 30 grams of plasticizer were added to 100 grams of a resin, the plasticizer would be present in an amount of 30 phr. If the resin composition, layer, or interlayer includes two or more resins, the weight of plasticizer is compared to the combined amount of the resins present to determine the parts per hundred resin. Further, when the plasticizer content of a layer or interlayer is provided herein, it is provided with reference to the amount of plasticizer in the mix or melt that was used to produce the layer or interlayer.

In some embodiments, the plasticizer may be present in an amount of at least about 42, at least about 45, at least about 50, at least about 55, at least about 60, at least about 65, or at least about 70 phr, while, in some embodiments, the plasticizer may be present in an amount of not more than about 50, not more than about 45, not more than about 42, not more than about 40, not more than about 38, not more than about 35, not more than about 30, not more than about 30, not more than about 25, not more than about 20, not more than about 17, not more than about 15, not more than about 12, or not more than about 10 phr.

Examples of suitable plasticizers can include, but are not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate) ("4GEH"), polyethylene glycol bis(2-ethylhexanoate), dipropylene glycol dibenzoate, dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. The plasticizer may be selected from the group consisting of triethylene glycol di-(2-ethyl hexanoate), tetraethylene glycol di-(2-ethyl hexanoate), and combinations thereof. In some embodiments, at least two plasticizers may be present in the compositions, layers, and interlayers described herein, with one of the plasticizers enhancing the compatibility of one or more other plasticizers in the composition. The refractive index, measured according to ASTM D542 at a wavelength of 589 nm and 25° C., of one or all plasticizers in the composition can be at least about 1.440, at least about 1.442, at least about 1.445 and/or no more than about 1.500, not more than about 1.475, not more than about 1.460, not more than about 1.455, or not more than about 1.450, or in the range of from about 1.440 to about 1.500, about 1.442 to about 1.475, about 1.445 to about 1.460.

One or more resin compositions, layers, and interlayers described herein may include various other additives to impart particular properties or features to the interlayer. Such additives can include, but are not limited to, dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers.

Additionally, various adhesion control agents ("ACAs") can be used in the interlayers of the present disclosure to control the adhesion of the sheet to glass. In various embodiments, the amount of ACAs present in a resin composition, layer, or interlayer can be at least about 0.003, at least about 0.01, at least about 0.025 and/or not more than about 0.15, not more than about 0.10, or not more than about 0.04 phr, or in the range of from about 0.003 to about 0.15, about 0.01 to about 0.10, or about 0.025 to about 0.04 phr. Suitable ACAs can include, but are not limited to, residual sodium acetate, potassium acetate, magnesium bis(2-ethyl butyrate), magnesium bis(2-ethylhexanoate), and combinations thereof, as well as the ACAs disclosed in U.S. Pat. No. 5,728,472.

When two or more poly(vinyl acetal) resins are utilized in a resin composition, layer, or interlayer, and at least one of the resins has a residual hydroxyl and/or acetate contents different from one or more other resins, the differences may be selected to control or provide certain performance properties, such as strength, impact resistance, penetration resistance, processability, or acoustic performance to the final composition, layer, or interlayer. For example, poly(vinyl acetal) resins having a higher residual hydroxyl content, usually greater than about 14 weight percent, can facilitate increased impact resistance, penetration resistance, and strength to a resin composition or layer, while lower hydroxyl content resins, usually having a residual hydroxyl content of less than 13 weight percent, can improve the acoustic performance of the interlayer or blend.

Poly(vinyl acetal) resins having higher or lower residual hydroxyl contents and/or residual acetate contents, when combined with at least one plasticizer, ultimately include different amounts of plasticizer. As a result, different layers within a multilayered interlayer, for example, may have different properties. Although not wishing to be bound by theory, it is understood that the compatibility of a given plasticizer with a poly(vinyl acetal) resin can depend, at least in part, on the composition of the polymer, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer resin layer that exhibits a lower glass transition temperature than a similar resin having a higher residual hydroxyl content. Depending on the specific resin and plasticizer, however, these trends could be reversed.

When two poly(vinyl acetal) resins having different levels of residual hydroxyl content are blended with a plasticizer, the plasticizer may partition between the resin layers or domains, such that more plasticizer can be present in the layer or domain having the lower residual hydroxyl content and less plasticizer may be present in the layer or domain having the higher residual hydroxyl content. Ultimately, a state of equilibrium is achieved between the two resins. The correlation between the residual hydroxyl content of a poly(vinyl acetal) resin and plasticizer compatibility/capacity can facilitate addition of a proper amount of plasticizer to the polymer resin. Such a correlation also helps to stably maintain the difference in plasticizer content between two or more resins when the plasticizer would otherwise migrate between the resins.

In some embodiments, when the resin layer or interlayer includes at least a first resin layer comprising a first poly(vinyl acetal) resin and a first plasticizer, and a second resin layer, adjacent to the first resin layer, comprising a second poly(vinyl acetal) resin and a second plasticizer, the resin layers may have different plasticizer contents. For example, the difference in plasticizer content between the resin layers can be at least about 2, at least about 5, at least about 8, at least about 10, at least about 12, or at least about 15 phr. In most embodiments, the resin layer that includes the resin having a lower hydroxyl content can have the higher plasticizer content. In order to control or retain other properties of the resin layer or interlayer, the difference in plasticizer content between the first and second resin layers may be not more than about 30, not more than about 25, not more than about 20, or not more than about 17 phr.

In some embodiments, the first and second resin layers can exhibit different glass transition temperatures. Glass transition temperature, or $T_g$, is the temperature that marks the transition from the glass state of the polymer to the rubbery state. The glass transition temperatures of the resins and layers described herein were determined by dynamic mechanical thermal analysis (DTMA). The DTMA measures the storage (elastic) modulus (G') in Pascals, loss (viscous) modulus (G") in Pascals, and the tan delta (G"/G') of the specimen as a function of temperature at a given frequency and temperature sweep rate. The glass transition temperature was then determined by the position of the tan delta peak on the temperature scale. Glass transition temperatures provided herein were determined at a frequency of 1 Hz and a sweep rate of 3° C./min.

The difference in the glass transition temperature of the first resin layer and the glass transition temperature of the second resin layer can be at least about 3, at least about 5, at least about 8, at least about 10, at least about 12, at least about 15, at least about 18, at least about 20, at least about 22, or at least about 25° C. One of the first and second resin layers can have a glass transition temperature of at least about 25, at least about 27, at least about 30, at least about 33, at least about 35, at least about 37° C. and/or not more than about 70, not more than about 65, not more than about 60, not more than about 55, not more than about 50° C., or in the range of from about 25 to about 70, about 27 to about 60, about 35 to about 50. The other of the first and second poly(vinyl acetal) resins can have a glass transition temperature of less than 25, not more than about 20, not more than about 15, not more than about 10, not more than about 5, not more than about 2, not more than about 1, not more than about 0, not more than about −1, not more than about −2° C.

According to various embodiments of the present invention, resin compositions, layers, and interlayers as described herein that include at least one poly(vinyl acetal) resin having residues of an aldehyde other than n-butyraldehyde may exhibit different properties, such as, for example, glass transition temperature, refractive index, and tan delta, as compared to similar resin compositions, layers, and interlayers formed using conventional poly(vinyl n-butyral) resins.

For example, in some embodiments, poly(vinyl acetal) resins including residues of aldehydes other than n-butyraldehyde may have a different molecular weight than a comparable poly(vinyl n-butyral) resin. As used herein, the term "comparable poly(vinyl n-butyral) resin" refers to a poly (vinyl acetal) resin having the same residual acetal, residual hydroxyl, and acetate content as a given poly(vinyl acetal) resin, but that includes an acetal component including only residues of n-butyraldehyde. In various embodiments, the poly(vinyl acetal) resin that includes residues of an aldehyde other than n-butyraldehyde can have a molecular weight that is at least about 5, at least about 10, at least about 15, or at least about 20 percent higher or lower than the molecular weight of a comparable poly(vinyl n-butyral) resin.

In some embodiments, the molecular weight of the poly (vinyl acetal) resin including residues of an aldehyde other than n-butyraldehyde can be lower than a comparable poly (vinyl n-butyral) resin. The molecular weight of poly(vinyl acetal) resins comprising residues of an aldehyde other than n-butyraldehyde may be at least about 10,000, at least about 15,000, at least about 20,000, at least about 25,000 and/or not more than about 250,000, not more than about 200,000, not more than about 150,000, not more than about 100,000, or not more than about, or less than about, 50,000 Daltons, or in the range of from about 10,000 to about 250,000, about 15,000 to about 200,000, about 20,000 to about 150,000, or about 25,000 to about 50,000 Daltons. In contrast, a poly (vinyl n-butyral) (PVB) resin may have a molecular weight of at least about 50,000, at least about 70,000, at least about 80,000, at least about 90,000, at least about 100,000 Daltons and/or not more than about 600,000, not more than about 550,000, not more than about 500,000, not more than about 450,000, not more than about 425,000, or not more than about 325,000 Daltons, measured by size exclusion chromatography using low angle laser light scattering (SEC/LALLS) method of Cotts and Ouano. As used herein, the term "molecular weight" refers to the weight average molecular weight ($M_w$). The molecular weight of the PVB resin can be in the range of from about 50,000 to about 600,000, about 70,000 to about 450,000, about 80,000 to about 425,000, or about 90,000 to about 325,000 Daltons.

In some embodiments, poly(vinyl acetal) resin having residues of an aldehyde other than n-butyraldehyde can have higher compatibility with a plasticizer than a comparable poly(vinyl n-butyral) resin. Higher compatibility of a poly (vinyl acetal) resin in a given plasticizer can be measured as the cloud point of the resin in that plasticizer. As used herein, the term "cloud point" refers to the temperature at which a dissolved solid is no longer completely soluble in a liquid. Cloud point is measured by mixing 0.05 grams of resin with 1.95 grams of a plasticizer at room temperature and then heating the mixture in a silicone oil bath under continuous stirring conditions until the resin is completely dissolved and the solution is clear. The heating is then stopped and the temperature continuously monitored. The temperature at which the solution begins to cloud, which indicates precipitation of solid resin from the solution, is the cloud point temperature.

In some embodiments, poly(vinyl acetal) resins that include residues of an aldehyde other than n-butyraldehyde can have a lower cloud point than a comparable poly(vinyl n-butyral) resin in one or more plasticizers. For these plasticizers, this indicates higher compatibility with the plasticizer than a comparable poly(vinyl n-butyral) resin. In some embodiments, the poly(vinyl acetal) resin comprising residues of an aldehyde other than n-butyraldehyde can have a cloud point temperature that is at least about 1, at least about 2, at least about 5, or at least about 10° C. lower than the cloud point temperature of a comparable poly(vinyl n-butyral) resin in a given plasticizer. The plasticizer can be one or more of those listed above.

Additionally, poly(vinyl acetal) resins comprising residues of an aldehyde other than n-butyraldehyde may have a lower viscosity than a comparable poly(vinyl n-butyral) resin. For example, in some embodiments, the viscosity of a poly(vinyl acetal) resin comprising residues of an aldehyde other than n-butyraldehyde can be at least about 5, at least about 10, at least about 15, or at least about 20 percent lower than the viscosity of a comparable poly(vinyl n-butyral) resin. As used herein, solution viscosity was measured using a Cannon Fenske capillary viscometer size 400, commercially available from Cannon Instrument Company, State College, Pa., at 20° C. in a 7.5 percent methanol solution. Once the solution has been prepared, the solution is allowed to equilibrate in a 20° C.±0.1° C. water bath for at least 30 minutes. The viscometer is placed in the water bath and 10 mL of the solution is transferred to the viscometer using a fast flow pipette by pressing the fluid with a pressure bulb to beyond the upper mark of the viscometer, and recording the time taken by the liquid level to pass between the upper and lower marks. The viscosity of a poly(vinyl acetal) resin comprising residues of an aldehyde other than n-butyraldehyde can be at least about 5, at least about 10, at least about 15, at least about 20, or at least about 30 centipoise (cps) lower than the viscosity of a comparable poly(vinyl n-butyral) resin.

Additionally, a poly(vinyl acetal) resin comprising residues of an aldehyde other than n-butyraldehyde may also have a glass transition temperature that is different than the glass transition temperature of a comparable poly(vinyl butyral) resin. For example, the glass transition temperature of the poly(vinyl acetal) resin including residues of an aldehyde other than n-butyraldehyde can be at least about 5, at least about 10, at least about 15, at least about 20, or at least about 25 percent higher or lower than the glass transition temperature of a comparable poly(vinyl n-butyral) resin. The glass transition temperature of the poly(vinyl acetal) resin comprising residues of an aldehyde other than n-butyraldehyde can be at least about 2, at least about 3, at least about 3.5, at least about 4, at least about 4.5, at least about 5, at least about 6, at least about 10, or at least about 12° C. higher or lower than the glass transition temperature of a comparable poly(vinyl n-butyral) resin.

In some embodiments, the poly(vinyl acetal) resin including residues of an aldehyde other than n-butyraldehyde may have a glass transition temperature of not more than about 83, not more than about 82, not more than about 80, not more than about 75, not more than about 70, not more than about 65, not more than about 60, or not more than about 55° C., while in other embodiments, the glass transition temperature of the poly(vinyl acetal) resin comprising residues of an aldehyde other than n-butyraldehyde can be at least about 80, at least about 82, at least about 83, at least about 84, at least about 85, or at least about 86° C., measured as described previously. When two or more poly(vinyl acetal) resins are present in a composition, layer, or interlayer, the difference in glass transition temperature between one of the resins and at least one or more other resins can be at least about 2, at least about 5, at least about 10, or at least about 15° C.

Further, poly(vinyl acetal) resins comprising residues of an aldehyde other than n-butyraldehyde may also have a refractive index different than a comparable poly(vinyl n-butyral) resin. Refractive index was measured according to ASTM D542 at a wavelength of 589 nm and 25° C. The refractive index of a poly(vinyl acetal) resin comprising residues of an aldehyde other than n-butyraldehyde can be at least about 0.001, at least about 0.002, at least about 0.003, at least about 0.004, at least about 0.005 and/or not more than about 0.010, not more than about 0.007, or not more than about 0.006 higher or lower than the refractive index of a comparable poly(vinyl butyral) resin, or the difference can be in the range of from about 0.001 to about 0.010, about 0.002 to about 0.007, or about 0.003 to about 0.006. In some embodiments, the refractive index of the poly(vinyl acetal) resin comprising residues of an aldehyde other than n-butyraldehyde can be at least about 1.480, at least about 1.481, at least about 1.482, at least about 1.483, or at least about 1.484. In some embodiments, the refractive index of the poly(vinyl acetal) resin including residues of an aldehyde other than n-butyraldehyde can be not more than about 1.490, not more than about 1.489, not more than about 1.488, not more than about 1.487, not more than about 1.486, not more than about 1.485, not more than about 1.484, not more than about 1.483, not more than about 1.482, not more than about 1.481, or not more than about 1.480. The refractive index of the poly(vinyl acetal) resin comprising residues of an aldehyde other than n-butyraldehyde can be in the range of from about 1.480 to about 1.490, about 1.482 to about 1.489, or about 1.483 to about 1.488.

As discussed previously, poly(vinyl acetal) resins comprising residues of an aldehyde other than n-butyraldehyde may, in some embodiments, be physically mixed with a poly(vinyl n-butyral) resin or may further include resins of n-butyraldehyde. Such combinations, which include a first poly(vinyl acetal) resin component and a second poly(vinyl acetal) resin component, may also exhibit unexpected properties, including glass transition temperature, viscosity, refractive index, and others. As used herein, the term "poly (vinyl acetal) resin component," refers either to an individual poly(vinyl acetal) resin present in a blend of resins or to an acetal moiety present on a single poly(vinyl acetal) resin. In some embodiments of the present invention, a blend of first and second poly(vinyl acetal) resin components may not only exhibit properties different than each individual component, but may also exhibit properties unexpected for the combination.

For example, in some embodiments, a resin composition may comprise a first poly(vinyl acetal) resin component and a second poly(vinyl acetal) resin component. The first poly (vinyl acetal) resin component can have a first value, A, for a selected resin property, and the second poly(vinyl acetal) resin component can have a second value B, for the same selected resin property. When the poly(vinyl acetal) resin components comprise different acetal moieties on a single resin, the values, A and B, for the selected resin property correspond to the values for that property exhibited by a poly(vinyl acetal) resin including only residues of that aldehyde. For example, if the first poly(vinyl acetal) resin component included residues of i-butyraldehyde, the value, A, for the selected resin property for the first poly(vinyl acetal) resin component would be the value of that property for a poly(vinyl acetal) resin including only residues of i-butyraldehyde. The selected resin property can be any measurable property of a poly(vinyl acetal) resin. Examples of resin properties can include, but are not limited to, glass transition temperature, tan delta, refractive index, viscosity, melt flow, impact resistance, and others. In some embodiments, the resin property can be selected from the group consisting of glass transition temperature, tan delta, refractive index, and viscosity.

According to some embodiments of the present invention, the resin composition, which includes the first and second poly(vinyl acetal) resin components, which may be present in the composition in respective amounts of Y and Z weight percent, can have an actual value, C, for the selected resin property that is not equal to a value within about 15, within about 10, or within about 5 percent of the calculated value, C', calculated by equation (1), below.

$$C' = (Y \times A) + (Z \times B) \quad (1)$$

In some embodiments, the actual value, C, of the selected resin property for the resin composition can be closer to the value, A, of the selected resin property of the first poly(vinyl acetal) resin component such that the absolute value of the difference between A and C is less than the absolute value of the difference between C and B. In other embodiments, the actual value, C, of the selected resin property can be closer to the value, B, of the selected resin property of the second poly(vinyl acetal) resin component such that the absolute value of the difference between B and C is less than the absolute value of the difference between C and A.

Additionally, the first and second poly(vinyl acetal) resin components can have respective first and second values, R and S, for another resin property and the resin composition may have a value, T, for the other property. In some embodiments, the actual composition value, T, may not have a value that falls within about 15, within about 10, or within about 5 percent of the value, T', calculated by equation (2), below.

$$T' = (Y \times R) + (Z \times S) \quad (2)$$

However, in other embodiments, at least one resin property may have an actual composition value that falls within about 15, within about 10, within about 5, within about 2, or may equal the calculated value, T', determined by equation (2), above. In some embodiments, the values for R, S, and T may be substantially the same, such that each value is within about 15, within about 10, or within about 5 percent of each of the others. The first and second poly(vinyl acetal) resin components and the resin composition may include one or more other properties that fall within one of the ranges described previously. The first poly(vinyl acetal) resin component, second poly(vinyl acetal) resin component, and/or resin composition may have values for other resin properties, including glass transition temperature and viscosity, that fall within one or more of the ranges provided previously.

When a resin layer or interlayer includes at least one poly(vinyl acetal) resin including residues of an aldehyde other than n-butyraldehyde, the layer or interlayer may also exhibit unexpected or enhanced properties, as compared to a comparable resin layer formed from a poly(vinyl n-butyral) resin and a plasticizer of the same type and in the same amount. As used herein, the term "comparable poly(vinyl n-butyral) resin layer," refers to a resin layer formed using a comparable poly(vinyl n-butyral) resin, as defined previously, and a plasticizer of the same type and in the same amount as a given layer.

A resin layer that includes at least one poly(vinyl acetal) resin having residues of an aldehyde other than n-butyraldehyde can have a different glass transition temperature than a comparable poly(vinyl n-butyral) resin layer. For example, in various embodiments, the glass transition temperature of a resin layer including a poly(vinyl acetal) resin having residues of an aldehyde other than n-butyraldehyde can be at least about 0.25, at least about 0.50, at least about 1, at least about 1.5, at least about 2, at least about 3, at least about 4, or at least about 5° C. higher or lower than the glass transition temperature of a comparable poly(vinyl n-butyral) resin layer. In some embodiments, the glass transition temperature of the resin layer that comprises a poly(vinyl acetal) resin having residues of an aldehyde other than n-butyraldehyde can be at least about 25, at least about 30, at least about 35, or at least about 37° C., while, in some embodiments, it may be less than about 25, not more than about 20, not more than about 15, not more than about 10, not more than about 5, not more than about 2, not more than about 1, not more than about 0, not more than about −1, not more than about −2° C., measured as described previously.

According to some embodiments of the present invention, the resin layer may have a high glass transition temperature, such as, for example a glass transition temperature of greater than about 46° C. Such a resin layer, which may also be used as a single-layer interlayer or may be combined with one or more other layers to form a dual-layer interlayer or a multilayer interlayer comprising three or more layers, may be used in applications requiring high levels of impact resistance or strength. In various embodiments, such an interlayer may be formed by combining at least one poly(vinyl acetal) resin comprising at least 10 weight percent of residues of an aldehyde other than n-butyraldehyde and a plasticizer. The plasticizer may be present in the composition in an amount to provide the resin layer with a glass transition temperature greater than 46° C. such as, for example, an amount of at least about 1, at least about 2, at least about 5 phr and/or not more than about 30, not more than about 25, not more than about 20, not more than about 15 phr, or not more than about 10 phr, or an amount in the range of from about 1 to about 30, about 2 to about 25, about 5 to about 15, about 5 to about 30, or about 5 to about 20 phr. The glass transition temperature of the layer or interlayer can be at least about 30, at least about 37, at least about 40, at least about 46, at least about 48, at least about 50, at least about 52, at least about 54, at least about 55, at least about 60, at least about 65, or at least about 70° C.

In some embodiments, such layers and interlayers may be utilized in a multiple layer panel with at least one rigid substrate, examples of which are provided below. The rigid substrate may be any transparent, rigid substrate. In some embodiments, the rigid substrate may be a glass substrate, such as, for example, a glass substrate may be selected from the group consisting of flat glass, float glass, warped glass, wavy glass, tempered glass, heat-strengthened glass, bent glass, chemically tempered glass, and combinations thereof. In some embodiments, the glass substrate may be selected from the group consisting of warped glass, wavy glass, tempered glass, heat-strengthened glass, bent glass, and combinations thereof. Additional embodiments of multiple layer panels, including one or more different types of rigid substrates will be discussed in detail shortly.

Resin layers that include at least one poly(vinyl acetal) resin including residues of an aldehyde other than n-butyraldehyde can also exhibit enhanced optical properties such as, for example, refractive index. In some embodiments, the refractive index of a resin layer including at least one poly(vinyl acetal) resin including residues of an aldehyde other than n-butyraldehyde can be at least about 0.001, at least about 0.002, at least about 0.003, at least about 0.004, at least about 0.005 and/or not more than about 0.010, not more than about 0.007, or not more than about 0.006 higher or lower than the refractive index of a comparable poly(vinyl n-butyral) resin layer. The difference between the refractive index of a resin layer including at least one poly(vinyl acetal) resin including residues of an aldehyde other than n-butyraldehyde and the refractive index of a comparable poly(vinyl n-butyral) resin layer can be in the range of from 0.001 to about 0.010, about 0.002 to about 0.007, or about 0.003 to about 0.006.

In some embodiments, the refractive index of the resin layer that includes at least one poly(vinyl acetal) resin having residues of an aldehyde other than n-butyraldehyde can be at least about 1.470, at least about 1.471, at least about 1.472, at least about 1.473, at least about 1.474, at least about 1.475, at least about 1.476, at least about 1.477, at least about 1.480 and/or not more than about 1.490, not more than about 1.489, not more than about 1.488, not more than about 1.487, not more than about 1.486, not more than about 1.485, not more than about 1.484, not more than about 1.483, not more than about 1.482, not more than about 1.481, not more than about 1.480, or not more than about 1.479, or not more than about 1.478, measured as described previously. The refractive index of the resin layer having residues of an aldehyde other than n-butyraldehyde can be in the range of from about 1.470 to about 1.490, about 1.572 to about 1.488, about 1.475 to about 1.486, about 1.477 to about 1.485, about 1.480 to about 1.484.

In some embodiments, the resin layer including at least one poly(vinyl acetal) resin having residues of an aldehyde other than n-butyraldehyde may also exhibit enhanced acoustic properties, such as, for example, an improved tan delta as compared to a comparable poly(vinyl n-butyral) resin layer. Tan delta is the ratio of the loss modulus (G") in Pascals to the storage modulus (G') in Pascals of a specimen measured by Dynamic Mechanical Thermal Analysis (DMTA). The DTMA is performed with an oscillation frequency of 1 Hz under shear mode and a temperature sweep rate of 3° C./min. The peak value of the G"/G' curve at the glass transition temperature is the tan delta value. Higher tan delta values are indicative of higher damping, which can translate to better sound dampening, or acoustic, performance.

In some embodiments, the tan delta of the resin layer including at least one poly(vinyl acetal) resin having residues of an aldehyde other than n-butyraldehyde can be at least about 1, at least about 2, at least about 3, at least about 4, at least about 5, at least about 10, at least about 15, or at least about 20 percent higher than the tan delta of a comparable poly(vinyl n-butyral) resin. The tan delta of the resin layer comprising the poly(vinyl acetal) resin including residues of an aldehyde other than n-butyraldehyde can be at least about 0.70, at least about 1.0, at least about 1.05, at least about 1.10, at least about 1.15, at least about 1.20, at least about 1.25, at least about 1.30, at least about 1.35, or at least about 1.40, measured as described previously.

Additionally, when the resin layer or interlayer includes at least a first poly(vinyl acetal) resin component and a second poly(vinyl acetal) resin component along with at least one plasticizer, one or more properties of the layer or interlayer can be different than expected. For example, the resin layer, which may include x phr of a plasticizer along with Y weight percent of a first poly(vinyl acetal) resin component and Z weight percent of a second poly(vinyl acetal) resin component, may also have an actual value, D, for at least one resin layer property that is not equal to the calculated value, D', determined by equation (3) below. In equation (3), E is the value of the selected layer property for a resin layer formed from a resin including only the first poly(vinyl acetal) resin component and x phr of the plasticizer and F is the value of the selected resin layer property for a resin layer formed from a resin including only the second poly(vinyl acetal) resin component and x phr of the plasticizer.

$$D' = (Y \times E) + (Z \times F) \quad (3)$$

Examples of resin layer properties can include, but are not limited to, glass transition temperature, refractive index, and tan delta. Values for these properties may fall within the ranges provided above. Additionally, the amount of plasticizer present in the resin composition can fall within any of the ranges above. The resin layer may also have at least one other actual resin layer value that is not equal to a value within about 15, within about 10, or within about 5 percent of the calculated value, D', determined by equation (3) above and/or may have at least one other actual resin layer value that falls within about 15, within about 10, within about 5, within about 2, or is equal to the calculated value D' determined by equation (3) above. In various embodiments, E and F may both have a value within about 15, within about 10, or within about 5 percent of the actual resin layer value D.

According to various embodiments of the present invention, a method of making a polymer interlayer is provided that comprises selecting and blending at least a first poly (vinyl acetal) resin or precursor thereto, and a second poly(vinyl acetal) resin or precursor thereto, in order to provide a blended resin composition, layer, or interlayer having desirable final properties. The method can include the step of identifying at least one resin layer property, including, for example, one or more properties selected from the group consisting of glass transition temperature, refractive index, viscosity, tan delta, impact resistance, melt flow, and combinations thereof. The target value for one or more resin layer properties can fall within at least one of the ranges provided previously.

The method may also include the step of selecting and blending at least a first poly(vinyl acetal) resin component and a second poly(vinyl acetal) resin component to provide a blended resin composition. The type and amount of the first and second poly(vinyl acetal) resin, or precursors thereto, can be any of those described herein and, in some embodiments, may be any of those described herein. When the blending includes blending first and second poly(vinyl acetal) resin resins, the blending can comprise a melt blending step and may be performed at a temperature of at least about 150, at least about 200, at least about 250° C. In other embodiments, when the blending includes blending poly (vinyl acetal) resin precursors, the blending step may include mixing a first and a second aldehyde and using the mixed aldehyde to form a blended resin. In some embodiments, the aldehydes can be mixed prior to forming the resin, such that a mixed aldehyde is reacted with the poly(vinyl alcohol). In other embodiments, at least a portion of the blending of the aldehydes may take place during acetalization. After acetalization, the formation of the blended resin may be carried out as described previously. Thereafter, at least one resin layer may be formed using the blended resin, optionally combined with one or more plasticizers of types and in amounts as discussed previously.

In various embodiments, the types and/or amounts of the first and second poly(vinyl acetal) resin components, or precursors thereto, may be selected in order to achieve a value for the selected resin layer property that is within about 20, within about 10, within about 5, or within about 2 percent of the target value identified previously. In some embodiments, the blending may be performed to produce a blended resin with a lower glass transition temperature than a comparable poly(vinyl n-butyral) resin so that less plasticizer is required to achieve a given glass transition temperature or certain acoustic property for the final layer. In some embodiments, the blending may be performed to produce a blended resin having a higher or lower refractive index than a comparable poly(vinyl n-butyral) resin in order to minimize dilution by a lower refractive index additive or to minimize the difference between the refractive indices of two resin layers. Other applications or uses for blending the poly(vinyl acetal) resins, or precursors thereto, are also possible and may be utilized according to various embodiments of the present invention.

The resulting blended resins can then be formed into one or more resin layers according to any suitable method. Exemplary methods of forming polymer layers and interlayers can include, but are not limited to, solution casting, compression molding, injection molding, melt extrusion, melt blowing, and combinations thereof. Multilayer interlayers including two or more resin layers may also be produced according to any suitable method such as, for example, co-extrusion, blown film, melt blowing, dip coating, solution coating, blade, paddle, air-knife, printing, powder coating, spray coating, and combinations thereof. In various embodiments of the present invention, the layers or interlayers may be formed by extrusion or co-extrusion. In an extrusion process, one or more thermoplastic polymers, plasticizers, and, optionally, at least one additive, can be pre-mixed and fed into an extrusion device. Other additives, such as ACAs, colorants, and UV inhibitors, which can be in liquid, powder, or pellet form, may also be used and may be mixed into the thermoplastic polymers or plasticizers prior to entering the extrusion device. These additives can be incorporated into the polymer resin and, by extension, the resultant polymer sheet, thereby enhancing certain properties of the polymer layer or interlayer and its performance in the final multiple layer glass panel or other end product.

In various embodiments, the thickness, or gauge, of the layers or interlayers can be at least about 10, at least about 15, at least about 20 mils and/or not more than about 100, not more than about 90, not more than about 60, not more than about 50, or not more than about 35 mils, or it can be in the range of from about 10 to about 100, about 15 to about 60, or about 20 to about 35 mils. In millimeters, the thickness of the polymer layers or interlayers can be at least about 0.25, at least about 0.38, at least about 0.51 mm and/or not more than about 2.54, not more than about 2.29, not more than about 1.52, or not more than about 0.89 mm, or in the range of from about 0.25 to about 2.54 mm, about 0.38 to about 1.52 mm, or about 0.51 to about 0.89 mm.

In some embodiments, the resin layers or interlayers can comprise flat polymer layers having substantially the same thickness along the length, or longest dimension, and/or width, or second longest dimension, of the sheet, while, in other embodiments, one or more layers of a multilayer interlayer, for example, can be wedge-shaped or can have a wedge-shaped profile, such that the thickness of the interlayer changes along the length and/or width of the sheet, such that one edge of the layer or interlayer has a thickness greater than the other. When the interlayer is a multilayer interlayer, at least one, at least two, or at least three of the layers of the interlayer can be wedge-shaped. When the interlayer is a monolithic interlayer, the polymer sheet can be flat or wedge shaped. Wedge-shaped interlayers may be useful in, for example, heads-up-display (HUD) panels in automotive and aircraft applications.

According to some embodiments wherein the resin compositions and layers described previously are used to form interlayers, the interlayers may also exhibit one or more improved or enhanced properties. The interlayers can comprise single, or monolithic, interlayers, or dual-layer interlayers having a pair of adjacent resin layers. In some embodiments, the interlayers can include three or more resin layers with at least a first, second, and third resin layer, with the second resin layer sandwiched between the first and third. When the interlayer includes two or more resin layers, adjacent resin layers can comprise different poly(vinyl acetal) resins, and can have one or more properties that differ from each other. In some embodiments, the poly(vinyl acetal) resins present in adjacent layers may have different residual hydroxyl and/or acetal contents that differ from each other by an amount within the ranges provided above.

In some embodiments, adjacent resin layers may have different glass transition temperatures, such as, for example, glass transition temperatures that differ from one another by at least about 3, at least about 5, at least about 8, at least about 10, at least about 12, at least about 15, at least about 18, at least about 20, at least about 22, or at least about 25° C. In the same embodiments, however, the difference between the refractive index of the adjacent layers may be minimized by, for example, utilizing at least one poly(vinyl acetal) resin comprising residues of an aldehyde other than n-butyraldehyde. For example, in some embodiments, the absolute value of the difference between refractive indices between adjacent resin layers, of which at least one includes a poly(vinyl acetal) resin comprising residues of an aldehyde other than n-butyraldehyde, can be not more than about 0.010. In some embodiments, the absolute value of the difference in the refractive indices between such layers can be not more than about 0.009, not more than about 0.008, not more than about 0.007, not more than about 0.006, not more than about 0.005, not more than about 0.004, not more than about 0.003, or not more than about 0.002.

As a result, interlayers according to various embodiments of the present invention exhibit optimized or enhanced optical properties. Clarity is one parameter used to describe the optical performance of compositions, layers, and interlayers described herein and may be determined by measuring haze value or percent. Haze value represents the quantification of light scattered by a sample in contrast to the incident light. In some embodiments, the resin blends, layers, and interlayers described herein may have a haze value of less than 5 percent, less than about 4 percent, less than about 3 percent, less than about 2 percent, less than about 1, or less than about 0.5 percent, as measured in accordance with ASTM D1003-61 (reapproved 1977)—Procedure A using Illuminant C, at an observer angle of 2 degrees. The test is performed with a hazemeter, such as a Model D25 Hazemeter commercially available from Hunter Associates (Reston, Va.), on a polymer sample which has been laminated between two sheets of clear glass, each having a thickness of 2.3 mm (commercially available from Pittsburgh Glass Works of Pennsylvania).

Another parameter used to determine the optical performance is transparency, or percent visual transmittance (% $T_{vis}$), which is measured using a hazemeter, such as a Model D25 Hazemeter commercially available from Hunter Associates (Reston, Va.), in an Illuminant D65 at an observer angle of 10°. The values provided herein were obtained by analyzing a polymer sample which had been laminated between two sheets of clear glass, each having a thickness of 2.3 mm (commercially available from Pittsburgh Glass Works of Pennsylvania). In some embodiments, the resin compositions, layers, and interlayers of the present invention can have a percent visual transmittance of at least about 80, at least about 81, at least about 82, at least about 83, at least about 84, at least about 85, at least about 85.5, at least about 86, at least about 86.5, at least about 87, at least about 87.5, at least about 88, or at least about 88.5 percent.

In addition to exhibiting one or more optical properties within the ranges above, the resin layers and interlayers described herein may also exhibit acoustic properties within a desirable range. For example, in some embodiments, the resin layers and interlayers can have a damping loss factor, or loss factor, of at least about 0.10, at least about 0.15, at least about 0.17, at least about 0.20, at least about 0.25, at least about 0.27, at least about 0.30, at least about 0.33, or at least about 0.35. Loss factor is measured by Mechanical Impedance Measurement as described in ISO Standard 16940. Polymer samples are laminated between two sheets of clear glass, each having a thickness of 2.3 mm, and are prepared to have a width of 25 mm and a length of 300 mm. The laminated samples are then excited at the center point using a vibration shaker, commercially available from Brüel and Kjær (Nærum, Netherlands) and an impedance head is used to measure the force required to excite the bar to vibrate and the velocity of the vibration. The resultant transfer function is recorded on a National Instrument data acquisition and analysis system and the loss factor at the first vibration mode is calculated using the half power method.

The resin compositions, layers, and interlayers according to embodiments of the present invention may be utilized in a multiple layer panel that comprises a resin layer or interlayer and at least one rigid substrate. Any suitable rigid substrate may be used and in some embodiments may be selected from the group consisting of glass, polycarbonate, biaxially oriented PET, copolyesters, acrylic, and combinations thereof. When the rigid substrate includes glass, the glass can be selected from the group listed previously. When the rigid substrate includes a polymeric material, the polymeric material may or may not include a hard coat surface layer. In some embodiments, the multilayer panels include a pair of rigid substrates with the resin interlayer disposed therebetween. The panels can be used for a variety of end use applications, including, for example, for automotive windshields and windows, aircraft windshields and windows, panels for various transportation applications such as marine applications, rail applications, etc., structural architectural panels such as windows, doors, stairs, walkways, balusters, decorative architectural panels, weather-resistant panels, such as hurricane glass or tornado glass, ballistic panels, and other similar applications.

When laminating the resin layers or interlayers between two rigid substrates, such as glass, the process can include at least the following steps: (1) assembly of the two substrates and the interlayer; (2) heating the assembly via an IR radiant or convective device for a first, short period of time; (3) passing the assembly into a pressure nip roll for the first de-airing; (4) heating the assembly for a short period of time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperature between 135° C. and 150° C. and pressures between 150 psig and 200 psig for about 30 to 90 minutes. Other methods for de-airing the interlayer-glass interface, as described according to some embodiments in steps (2) through (5) above include vacuum bag and vacuum ring processes, and both may also be used to form interlayers of the present invention as described herein.

In some embodiments, the multiple layer panel may include at least one polymer film disposed on the layer or interlayer, forming a multiple layer panel referred to as a "bilayer." In some embodiments, the interlayer utilized in a bilayer may include a multilayer interlayer, while, in other embodiments, a monolithic interlayer may be used. The use of a polymer film in multiple layer panels as described herein may enhance the optical character of the final panel, while also providing other performance improvements, such as infrared absorption. Polymer films differ from polymer layers or interlayers in that the films alone do not provide the necessary penetration resistance and glass retention properties. The polymer film can also be thinner than the sheet, and may have a thickness in the range of from 0.001 to 0.25 mm. Poly(ethylene terephthalate) ("PET") is one example of a material used to form the polymer film.

The following examples are intended to be illustrative of the present invention in order to teach one of ordinary skill in the art to make and use the invention and are not intended to limit the scope of the invention in any way.

Examples

The following Examples describe the preparation of several resin compositions, layers, and interlayers that include various poly(vinyl acetal) reins. As described below, several tests performed on many of the compositions, layers, and interlayers were used to evaluate the several properties of both comparative and inventive materials.

Example 1: Preparation of Poly(Vinyl Acetal) Resins

Several poly(vinyl acetal) resins were prepared by acetalizing poly(vinyl alcohol) with several different aldehydes having acetal chain lengths from 4 to 8 carbon atoms. Each resin was prepared by first dispersing poly(vinyl alcohol) powder in water in a 5-L glass reactor at ambient temperature. The resulting slurry was then heated to a temperature greater than 90° C. to dissolve the poly(vinyl alcohol) and the resulting solution was then cooled to ambient temperature. Upon addition of an aldehyde and an acid catalyst, poly(vinyl acetal) polymer precipitated within a few minutes. The resulting mixture was held for several hours in order to achieve the target conversion of the poly(vinyl alcohol) and, if necessary, the reaction mixture was heated to speed the conversion. Several aldehydes were used to form the various resins, including n-butyraldehyde (nBuCHO), i-butyraldehyde (iBuCHO), 2-methylbutyraldehyde (2MeBuCHO), 2-methylvaleraldehyde (2MeValCHO); and 2-ethylhexanaldehyde (2EHCHO).

Poly(vinyl acetal) solids precipitated from solution and were subsequently separated from the reaction fluid via filtration. The recovered solids were then washed multiple times with water and potassium hydroxide to remove impurities and neutralize the acid catalyst. The washed poly(vinyl acetal) was then dried using a lab-scale fluidized drier. Sheet samples of the resin were formed using a standard compression molding technique with a steam heated press. The percent residual hydroxyl content, glass transition temperature ($T_g$), and refractive index of the samples were measured and the results are provided in Table 1, below.

TABLE 1

Properties of Several Poly(vinyl acetal) Resins

| Resin | Aldehyde | PVOH (wt %) | Refractive Index (nD25) | Tg (° C.) |
| --- | --- | --- | --- | --- |
| R-1 | n-butyraldehyde | 18.7 | 1.487 | 78.8 |
| R-2 | n-butyraldehyde | 10.5 | 1.486 | 76.3 |
| R-3 | n-butyraldehyde | 9.1 | 1.483 | nd |
| R-4 | i-butyraldehyde | 18.7 | 1.480 | 88.6 |
| R-5 | i-butyraldehyde | 16.7 | 1.478 | 88.0 |
| R-6 | 2-methylbutyraldehyde | 26.7 | 1.488 | 81.1 |
| R-7 | 2-methylbutyraldehyde | 19.2 | 1.486 | 76.7 |
| R-8 | 2-methylvaleraldehyde | 22.3 | 1.487 | 65.2 |
| R-9 | 2-ethylhexanaldehyde | 17.3 | 1.486 | 50.7 | nd = not determined

Additionally, FIG. 1 provides a graphical representation of the tan delta of several of the resins listed in Table 1 as a function of temperature.

As shown in Table 1, above, poly(vinyl acetal) resins can be produced that have similar refractive indices and residual hydroxyl contents, but different glass transition temperatures. Additionally, as shown in Table 1, poly(vinyl acetal) resins having similar refractive indices may have significantly different glass transition temperatures, such as, for example, resins R-7 (RI=1.486; $T_g$=76.7° C.) and R-9 (RI=1.485; $T_g$=50.7° C.), or R-1 (RI=1.487; $T_g$=78.8° C.) and R-9 (RI=1.485; $T_g$=50.7° C.). This may permit the use of lower amounts of plasticizer when, for example, such resins are used in acoustic multilayer interlayers, while minimizing the difference in refractive indices between different resin layers. As a result, interlayers formulated with two or more of the above resins may exhibit enhanced optical and acoustic properties, as shown in the following Examples.

Example 2: Preparation of Mixed Poly(Vinyl Acetal) Resins

Several mixed poly(vinyl acetal) resins were prepared in a similar manner as described in Example 1 above, except the aldehyde added to the poly(vinyl alcohol) slurry included a mixture of two different aldehydes. The residual hydroxyl content of the resulting mixed poly(vinyl acetal) resins was determined using both NMR and the titration methods described above. All resins had a residual acetate content of 2 weight percent. The glass transition temperature and tan delta of sheets of each resin were also measured. The results are summarized in Table 2, below.

TABLE 2

Properties of Several Mixed Poly(vinyl acetal) Resins

| Resin | Residual nBuCHO (wt %) | Residual 2EHCHO (wt %) | Residual 2MeBuCHO (wt %) | Residual 2MeValCHO (wt %) | Residual OH (wt %) | $T_g$ (° C.) | Tan Delta |
|---|---|---|---|---|---|---|---|
| R-10 | 42 | 30 | — | — | 26 | 76.5 | 1.5 |
| R-11 | 16 | 49 | — | — | 33 | 76.2 | 0.8 |
| R-12 | 57 | 17 | — | — | 24 | 82.1 | 1.7 |
| R-13 | 49 | 24 | — | — | 25 | 78.7 | 1.6 |
| R-14 | 40 | 41 | — | — | 17 | 72.5 | 1.8 |
| R-15 | 40 | 42 | — | — | 16 | 70.7 | 1.8 |
| R-16 | 55 | 28 | — | — | 15 | 74.3 | 2.1 |
| R-17 | 52 | 28 | — | — | 18 | 77.7 | 1.9 |
| R-18 | 38 | 51 | — | — | 9 | 49.0 | 1.8 |
| R-19 | 75 | 11 | — | — | 12 | 68.2 | 2.3 |
| R-20 | 75 | 16 | — | — | 7 | 60.4 | 1.2 |
| R-21 | 73 | 17 | — | — | 8 | 55.0 | 2.0 |
| R-22 | 75 | 13 | — | — | 10 | 66.0 | 2.2 |
| R-23 | — | 81 | — | — | 17 | 50.7 | 1.8 |
| R-24 | — | — | 71 | — | 27 | 81.1 | 1.8 |
| R-25 | — | — | 78 | — | 20 | 76.7 | 2.5 |
| R-26 | — | — | — | 75 | 23 | 65.2 | 1.9 | nd = not determined

Example 3: Refractive Index Matching of Poly(Vinyl Acetal) Resins

Several of the resins prepared in Example 1 above were melt blended with various amounts of the plasticizer triethylene glycol bis(2-ethylhexanoate) ("3GEH") or tetraethylene glycol di-(2-ethylhexanoate) ("4GEH"). The plasticized resins were then formed into sheets and the glass transition temperature and refractive index of each sheet was measured. The results for resins plasticized with 3GEH and 4GEH are provided below in Tables 3a and 3b, respectively.

TABLE 3a

Properties of Poly(vinyl acetal) Resin Layers including 3GEH Plasticizer

| Resin | Residual Hydroxyl Content (wt %) | 3GEH Plasticizer Content | | | | | | | | |
|---|---|---|---|---|---|---|---|---|---|---|
| | | 20 phr | | 38 phr | | 50 phr | | 70 phr | | 75 phr | |
| | | $T_g$ (° C.) | RI | $T_g$ (° C.) | RI | $T_g$ (° C.) | RI | $T_g$ (° C.) | RI | $T_g$ (° C.) | RI |
| R-1 | 18.7 | nd | nd | 32.0 | 1.476 | nd | nd | nd | nd | nd | nd |
| R-2 | 10.5 | nd | nd | 21.1 | 1.475 | 9.14 | 1.472 | nd | nd | 0 | 1.466 |
| R-3 | 9.1 | 51 | 1.480 | nd | nd | nd | nd | 0 | 1.468 | nd | nd |
| R-4 | 18.7 | nd | nd | 33.8 | 1.474 | nd | nd | nd | nd | nd | nd |
| R-5 | 16.7 | 52 | 1.481 | 31.0 | 1.474 | 18 | 1.471 | nd | nd | nd | nd |
| R-9 | 17.3 | nd | nd | 13.4 | 1.472 | 6.7 | 1.470 | nd | nd | nd | nd | nd = not determined

TABLE 3b

Properties of Poly(vinyl acetal) Resin Layers including 4GEH Plasticizer

| | Residual Hydroxyl Content (wt %) | 4GEH Plasticizer Content | | | | | | | |
|---|---|---|---|---|---|---|---|---|---|
| | | 35 phr | | 38 phr | | 50 phr | | 70 phr | |
| Resin | | $T_g$ (°C.) | RI | $T_g$ (°C.) | RI | $T_g$ (°C.) | RI | $T_g$ (°C.) | RI |
| R-1 | 18.7 | 31 | 1.478 | nd | nd | nd | nd | nd | nd |
| R-2 | 10.5 | nd | nd | nd | nd | nd | nd | 0 | 1.471 |
| R-5 | 16.7 | nd | nd | 31.0 | 1.475 | nd | nd | nd | nd |
| R-9 | 17.3 | nd | nd | nd | nd | 3 | 1.473 | nd | nd | nd = not determined

Figure 2:
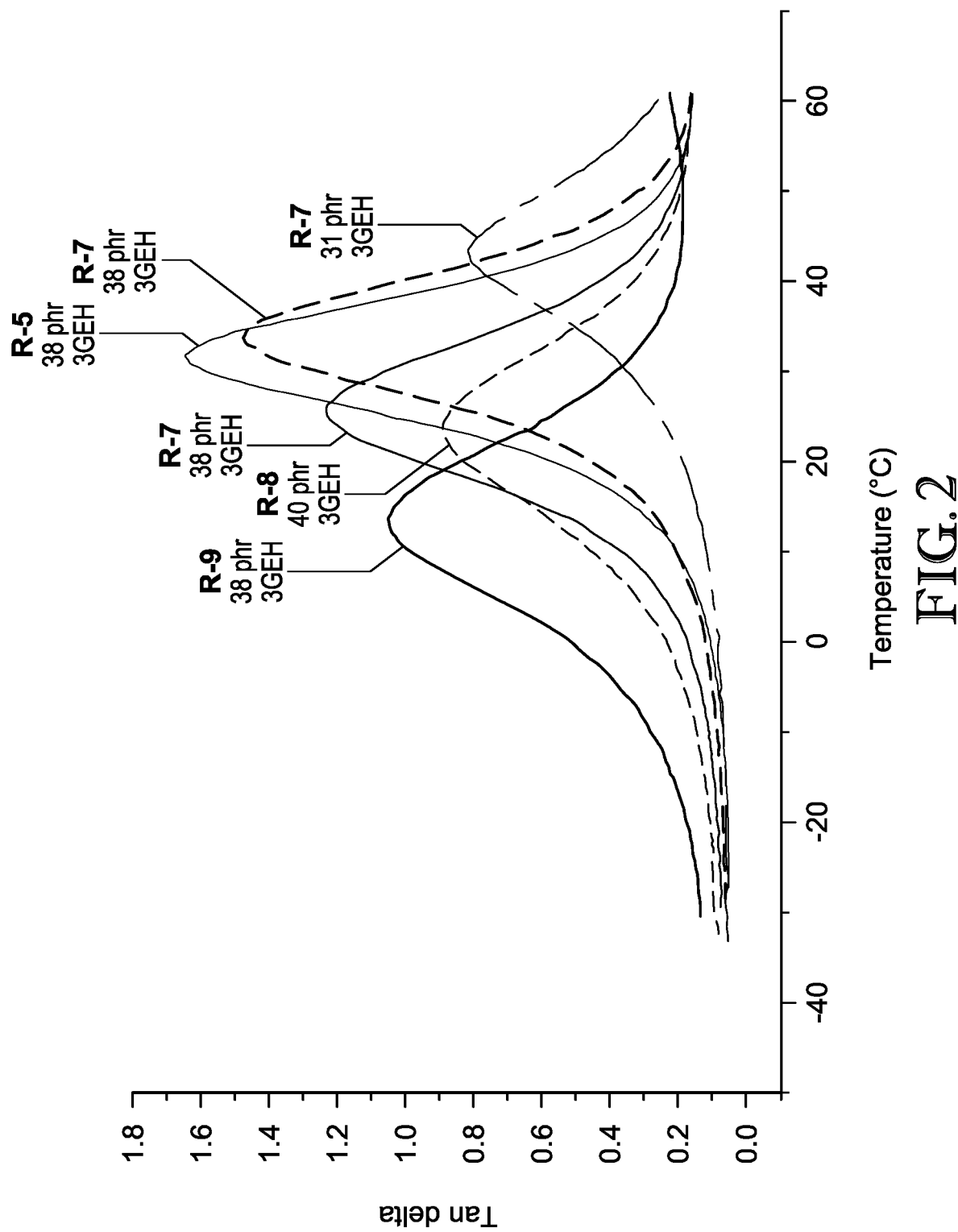
FIG. 2 is a graph depicting the tan delta of several plasticized poly(vinyl acetal) resins described in Example 3, over temperature range of −30 to 60° C.

Additionally, graphical representations of the tan delta as a function of temperature for several of the plasticized resins listed in Table 3a are provided in FIG. 2.

When formulating a multilayer interlayer, it is often desirable to include one or more higher glass transition temperature resins as the outer "skin" layers and lower glass transition temperature resin(s) as an inner "core" layer. Such configurations facilitate handling of the interlayer, as well as provide it with mechanical and impact strength, while also providing acoustic performance. As shown in Tables 3a and 3b, above, resins with lower residual hydroxyl contents typically include higher plasticizer contents and exhibit lower glass transition temperatures than higher residual hydroxyl content, lower plasticizer content resin layers.

Table 4, below, lists several combinations of high and low glass transition temperature resins shown in Table 3a and 3b above suitable as respective skin and core layers in multilayer interlayers.

TABLE 4

Properties of Poly(vinyl acetal) Resin Combinations

| | Skin | | | | Core | | | | $\Delta T_g$ (Skin - Core) | $\Delta$RI (Skin - Core) |
|---|---|---|---|---|---|---|---|---|---|---|
| Interlayer | Resin | Plasticizer | $T_g$ | RI | Resin | Plasticizer | $T_g$ | RI | | |
| CI-1 | R-1 | 38 (3GEH) | 32 | 1.476 | R-2 | 70 (3GEH) | 0 | 1.466 | 32 | 0.010 |
| DI-1 | R-4 | 38 (3GEH) | 33.8 | 1.474 | R-3 | 70 (3GEH) | 0 | 1.468 | 33.8 | 0.006 |
| DI-2 | R-5 | 38 (3GEH) | 31 | 1.474 | R-3 | 70 (3GEH) | 0 | 1.468 | 31 | 0.006 |
| DI-3 | R-5 | 38 (4GEH) | 31 | 1.475 | R-2 | 70 (4GEH) | 0 | 1.471 | 31 | 0.004 |
| DI-4 | R-1 | 38 (4GEH) | 31 | 1.478 | R-9 | 50 (4GEH) | 3 | 1.473 | 28 | 0.005 |
| DI-5 | R-5 | 38 (4GEH) | 31 | 1.475 | R-9 | 50 (4GEH) | 3 | 1.473 | 28 | 0.002 |

As shown in Table 4, a Comparative Interlayer, CI-1, included a resin layer having a high glass transition temperature poly(vinyl n-butyral) resin (R-1) adjacent to a resin layer having a low glass transition temperature poly(vinyl n-butyral) resin (R-2). The difference between the refractive indices of these two resins was 0.010, which is high enough to cause optical defects, such as reduced clarity or haze and/or mottle, in the final interlayer.

However, the high and low glass transition temperature resins of Disclosed Interlayers DI-1 through DI-5 had a maximum difference in refractive index of 0.006 (DI-1 and DI-2), with a difference as low as 0.002 (DI-5). Disclosed Interlayers DI-1 through DI-5 had a smaller difference in refractive index than Comparative Interlayer CI-1, which translated to fewer optical defects in the final laminated product. However, as shown in Table 4, above, Disclosed Interlayers DI-1 through DI-5 had similar differences in glass transition temperature between the skin and core layers as Comparative Interlayer CI-1, and, as a result, the Disclosed Interlayers retain the strength and acoustic properties of Comparative Interlayer CI-1, while exhibiting improved optical qualities.

Example 4: Properties of Mixed Poly(Vinyl Acetal) Resins

Two poly(vinyl acetal) resins, R-10 and R-11, were formed as described in Example 1, above, using n-butyraldehyde and i-butyraldehyde, respectively. The resulting poly (vinyl n-butyral) (PVB) resin (R-10) and poly(vinyl i-butyral) (PViB) resin (R-11) were then divided into several portions and melt blended with varying amounts of 3GEH. An additional poly(vinyl acetal) resin (R-12) was formed by mixing and melt blending 50 weight percent of poly(vinyl n-butyral) resin R-10 and 50 weight percent of poly(vinyl i-butyral) resin R-11. Mixed resin R-12 was also divided into several portions and combined with varying amounts of 3GEH. The refractive index of each plasticized resin sample was measured and the results, shown as a function of plasticizer content, are depicted graphically in FIG. 3.

Figure 3:
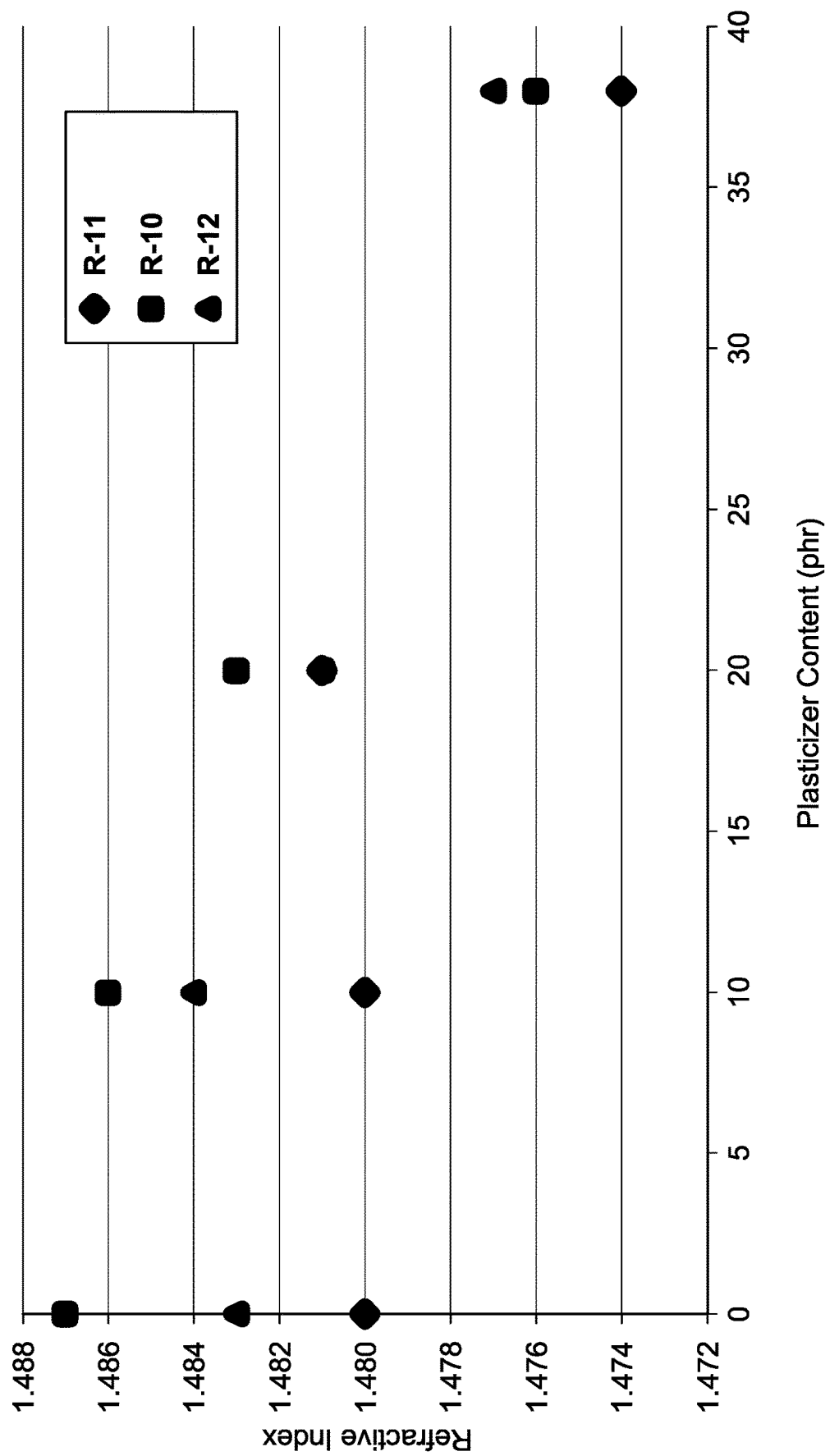
FIG. 3 is a graph depicting the refractive index of several poly(vinyl acetal) resins described in Example 4 as a function of plasticizer content.

As shown in FIG. 3, poly(vinyl i-butyral) resin R-11 exhibited the lowest refractive index of the three resins tested and, unlike the other two resins, it maintained a substantially constant refractive index up to a plasticizer loading of about 20 phr. Additionally, as shown in FIG. 3, none of the resins exhibited a strictly linear relationship between plasticizer loading and refractive index. For each plasticizer loading, blended resin R-12 had a refractive index between the refractive indices of its component resins, although the value was not an arithmetic average of the two.

Another mixed poly(vinyl acetal) resin (R-13) was formed in a similar manner as described in Example 1, above, but with a mixed aldehyde that included equal weights of i-butyraldehyde and n-butyraldehyde. The resulting hybrid resin R-13 had an acetal component that included moieties of both i-butyraldehyde and n-butyraldehyde and exhibited a similar trend in refractive index as a function of plasticizer loading as the physically blended resin R-12.

Several additional properties, including glass transition temperature, tan delta, and viscosity (in a 7.5 weight percent methanol solution) were also measured for resins R-10, R-11, physically blended resin R-12, and hybrid resin R-13 with varying amounts of 3GEH plasticizer. The results are summarized in Table 5 below. Additionally, Table 5 provides the arithmetic average of the values of each property for neat resins R-10 and R-11.

TABLE 5

Properties of Poly(vinyl acetal) Resins and Mixed Poly(vinyl acetal) Resin

|  | Resin | | | | Arithmetic Average of R-10 & R-11 Resin |
|---|---|---|---|---|---|
|  | R-10 | R-11 | R-12 | R-13 |  |
| Component | PVB | PViB | PVB/PViB | PVB/PViB |  |
| Weight Percent | 100 | 100 | 50/50 | 50/50 |  |
| Mix Method | — | — | Blend | Hybrid |  |
| Resin $T_g$ (° C.) | 79 | 89 | 75, 89 | 83.6 | 84 |
| Refractive Index (nD25) | 1.487 | 1.48 | 1.483 | 1.483 | 1.484 |
| Tan Delta | 2.35 | 2.75 | 2.02 | 2.64 | 2.55 |
| Viscosity (cps) | 175 | 122 | 137 | 115 | 148.5 |
| Resin with 20 phr 3GEH $T_g$ (° C.) | 46 | 52 | 49.5 | 51 | 49 |
| Refractive Index (nD25) | 1.483 | 1.481 | 1.481 | 1.483 | 1.482 |
| Tan Delta | 1.58 | 1.75 | 1.83 | 1.33 | 1.67 |
| Resin with 38 phr 3GEH $T_g$ (° C.) | 30 | 34 | 31.2 | 30.2 | 32 |
| Refractive Index (nD25) | 1.476 | 1.474 | 1.477 | 1.476 | 1.475 |
| Tan Delta | 1.25 | 1.45 | 1.21 | 1.32 | 1.35 |

As shown in Table 5, above, the values of several of the measured properties obtained for the blended resins R-12 and R-13, fall between, but are not necessarily the average of, the values obtained for neat resins R-10 and R-11, which are the constituents of the blend. Additionally, some properties such as glass transition temperature and refractive index, vary only slightly between neat resins R-10 and R-11 and mixed resins R-12 and R-13, while others, such as viscosity and tan delta, exhibit slightly more significant changes. Such information facilitates selection of specific resins or resin blends that provide desired properties or combinations of properties for various interlayer applications.

Example 5: Properties of Mixed Poly(Vinyl Acetal) Resins

Poly(vinyl n-butyral) (PVB) and poly(vinyl 2-ethylhexanal) (PV2EH) resins were prepared as described previously in Example 1 with two aldehydes in various ratios. The glass transition temperature of the mixed acetal resin, as well as the glass transition temperature of pure PVB and PV2EH resins, was determined and the results are summarized in Table 6, below.

TABLE 6

Glass Transition Temperatures of Blends of PVB and PV2EH

| Resin | PVB (wt %) | PV2EH (wt %) | Ratio of PV2EH:PVB | Residual Hydroxyl Content (wt %) | $T_g$ (° C.) |
|---|---|---|---|---|---|
| R-14 | 81.2 | 0.0 | — | 18.9 | 79.8 |
| R-15 | 86.5 | 0.0 | — | 13.5 | 77.7 |
| R-16 | 75.0 | 11.0 | 0.15:1 | 15.5 | 63.2 |
| R-17 | 75.0 | 13.0 | 0.17:1 | 14.6 | 61.0 |
| R-18 | 75.0 | 16.0 | 0.21:1 | 12.4 | 55.4 |
| R-19 | 73.0 | 17.0 | 0.23:1 | 12.1 | 50.0 |
| R-20 | 57.0 | 17.0 | 0.30:1 | 25.0 | 77.1 |
| R-21 | 49.0 | 24.0 | 0.49:1 | 26.4 | 73.7 |
| R-22 | 55.0 | 28.0 | 0.51:1 | 18.1 | 69.3 |
| R-23 | 52.0 | 28.0 | 0.54:1 | 19.1 | 72.7 |
| R-24 | 42.0 | 30.0 | 0.71:1 | 27.0 | 71.5 |
| R-25 | 40.0 | 41.0 | 1.03:1 | 19.2 | 67.5 |
| R-26 | 40.0 | 42.0 | 1.05:1 | 19.9 | 65.7 |
| R-27 | 38.0 | 51.0 | 1.34:1 | 12.9 | 44.0 |
| R-28 | 16.0 | 49.0 | 3.06:1 | 35.0 | 71.2 |
| R-29 | 0.0 | 81.7 | — | 17.3 | 50.7 |

As shown in Table 6, mixed poly(vinyl acetal) resins that have a wide range of glass transition temperatures can be produced with poly(vinyl n-butyral) and poly(vinyl 2-ethylhexanal) in various ratios. However, as illustrated by Table 7, below, a mixed acetal with equal parts by weight of PVB and PV2EH also exhibits a constant refractive index over the ranges shown in Table 6, above.

TABLE 7

Additional Properties of Blends of PVB and PV2EH

|  | Resin | | |
|---|---|---|---|
|  | R-30 | R-31 | R-32 |
| Component | PVB | PV2EH | PVB/PV2EH |
| Weight Percent | 86.5 | 81.7 | 40/41 |
| $T_g$ of Resin (° C.) | 77 | 51 | 68 |
| Refractive Index | 1.486 | 1.486 | 1.486 |
| $T_g$ at 38 phr 3GEH (° C.) | 28.5 | 18.4 | 20 |

Thus, resins such as PVB and PV2EH can be formulated into a mixed poly(vinyl acetal) resin that exhibits different glass transition temperatures over a wide blending range, but that have substantially the same refractive index.

Example 6: Preparation of High Flow Poly(Vinyl Acetal) Resins

A poly(vinyl n-butyral) resin (R-33) was prepared by acetalizing a 98 to 98.8 percent hydrolyzed poly(vinyl alcohol) (PVOH) with n-butyraldehyde (BuCHO) according to the procedure described in Example 1, above. The PVOH had a viscosity between 28 and 32 cps, measured in 4 percent water at 20° C. A poly(vinyl i-butyral resin) (R-34) was prepared under exactly the same conditions, but with i-butyraldehyde (iBuCHO). Two more resins, one poly(vinyl n-butyral) (R-35) and one poly(vinyl i-butyral) (R-36), were also prepared under the same conditions, but with a hydrolyzed poly(vinyl alcohol) (PVOH) having a viscosity between 18.5 and 21.5 cps. The viscosity of the resulting resins R-33 through R-36 was measured in a 7.5 percent solution of methanol at 20° C. and the results are summarized in Table 8, below.

TABLE 8

Properties of Poly(vinyl n-butyral) and Poly(vinyl i-Butyral) Resins

| Resin | Acetal Moiety | PVOH Viscosity (cps) | Resin Viscosity (cps) | Resin $T_g$ (° C.) | Resin $T_g$ at 38 phr 3GEH (° C.) |
|---|---|---|---|---|---|
| R-33 | nBuCHO | 28-32 | 170 | 78.8 | 30 |
| R-34 | iBuCHO | 28-32 | 110 | 88.6 | 35 |
| R-35 | nBuCHO | 18.5-21.5 | 90 | nd | nd |
| R-36 | iBuCHO | 18.5-21.5 | 68 | nd | nd | nd = not determined

As shown in Table 8, above, poly(vinyl i-butyral) resins R-34 and R-36 exhibited a lower viscosity than the poly(vinyl n-butyral) resins R-33 and R-35 prepared with the same poly(vinyl alcohol) under identical conditions. Additionally, the poly(vinyl i-butyral) resin (R-34) exhibited a higher glass transition temperature than its comparable poly(vinyl n-butyral) resin (R-33, even when plasticized with 38 phr of 3GEH.

Example 7: Preparation of High Glass Transition Temperature Resins

Several poly(vinyl acetal) resins were formulated according to the procedure described above in Example 1. Three of the resins were formulated using i-butyraldehyde (R-38 through R-40) and one was formed with n-butyraldehyde (R-37). Each of the resins was combined with a different amount of 3GEH plasticizer and formed into sheets. The glass transition temperature of each sheet was determined and the results are summarized in Table 9, below.

TABLE 9

Glass Transition Temperature of Plasticized Poly(vinyl acetal) Resins

| Resin | Acetal Moiety | Plasticizer Content (phr) | Tg (° C.) |
|---|---|---|---|
| R-37 | nBuCHO | 20 | 46 |
| R-38 | iBuCHO | 20 | 52 |
| R-39 | iBuCHO | 15 | 60 |
| R-40 | iBuCHO | 10 | 70 |

As shown in Table 9, above, for the same plasticizer content, the poly(vinyl i-butyral) resin R-38 achieves a higher glass transition temperature than the poly(vinyl n-butyral) resin R-37. Additionally, lower levels of plasticizer in the poly(vinyl i-butyral) resins R-38 through R-40 results in increased glass transition temperature, which provides these resins with increased impact and penetration resistance.

Example 8: Plasticizer Compatibility of Poly(Vinyl Acetal) Resin Layers

Several poly(vinyl acetal) resins of varying residual hydroxyl contents were prepared as described in Example 1, above. Some of the resins were formed with n-butyraldehyde and others were formed with i-butyraldehyde. The cloud point temperature of each resin was measured in triethylene glycol bis(2-ethylhexanoate) by mixing 0.05 grams of the resin in 1.95 grams of plasticizer at room temperature. The mixture was then heated in a silicone oil bath under continuous stirring conditions until the resin was completely dissolved and the solution was clear. The heating was stopped and the solution was gradually cooled under constant temperature monitoring. The temperature at which the solution began to cloud was determined to be the cloud point temperature of the resin in the plasticizer. The cloud point temperatures as a function of residual hydroxyl content were measured for several of the resins according to the method described previously and the results are summarized graphically in FIG. 4.

Figure 4:
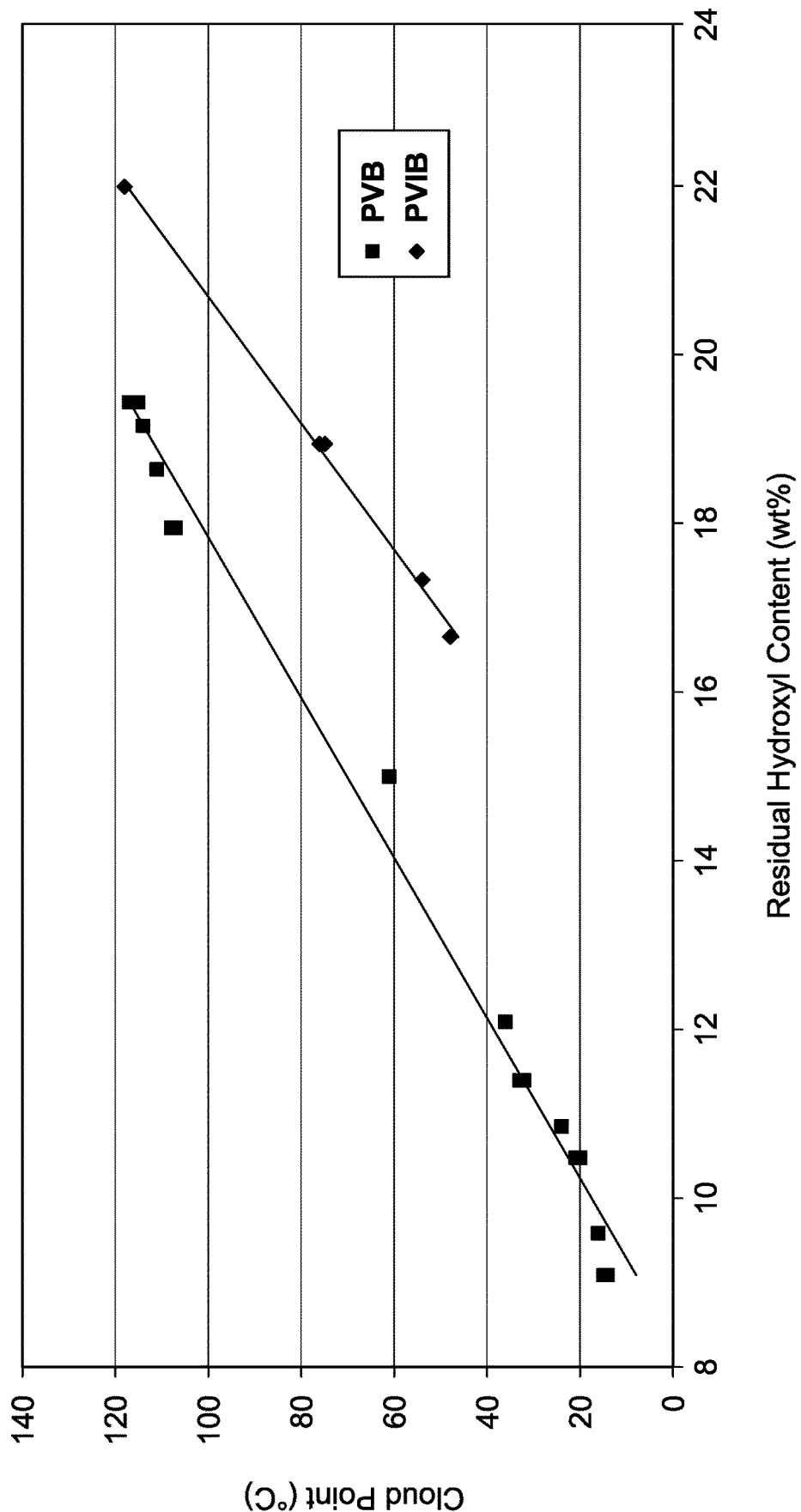
FIG. 4 is a graph depicting the cloud point of two poly(vinyl acetal) resins described in Example 8 as a function of residual hydroxyl content.

As shown in FIG. 4, for a given residual hydroxyl content, a resin formed with i-butyraldehyde had a lower cloud point temperature than a resin formed with n-butyraldehyde. Lower cloud point temperatures indicate higher plasticizer compatibility and, as shown in FIG. 4, the poly(vinyl acetal) resins prepared with i-butyraldehyde resin were more compatible with 3GEH than the poly(vinyl acetal) resins formed with n-butyraldehyde for the same residual hydroxyl content.

Example 9: Damping Properties of Poly(Vinyl Acetal) Resins

Two poly(vinyl i-butyral) acetal resins R-41 and R-42, each having different residual hydroxyl contents, were prepared according to the procedure described in Example 1 above. Resin R-41 had a residual hydroxyl content of 10.9 weight percent, and resin R-42 had a residual hydroxyl content of 9.1 weight percent. Another resin R-43 was also prepared as described in Example 1, above, but with n-butyraldehyde. The resulting poly(vinyl n-butyral) resin R-43 had a hydroxyl content of 10.5 weight percent. Each resin was separately mixed and melt blended with varying amounts of 3GEH or 4GEH plasticizer and the tan delta of each plasticized resin was measured over a temperature range of –20 to 30° C. The results are summarized graphically in FIG. 5.

Figure 5:
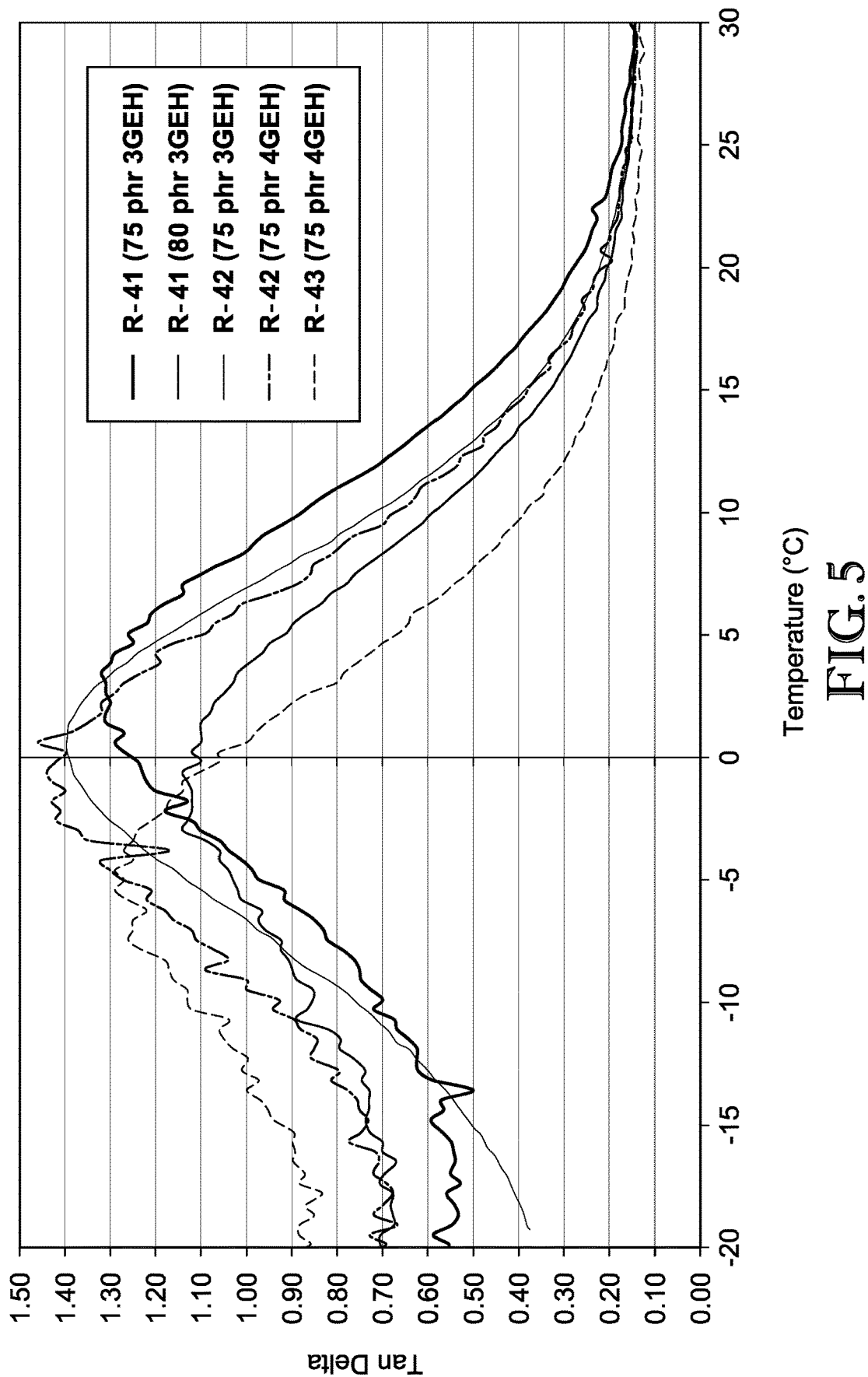
FIG. 5 is a graph depicting the tan delta of several plasticized resin compositions described in Example 9 over a temperature range of −20° C. to 30° C.

As shown in FIG. 5, the poly(vinyl i-butyral) resin R-42 plasticized with 75 phr of 3GEH exhibited a tan delta of 1.4 at a temperature of 0.5° C., which was nearly 31 percent higher than the tan delta of poly(vinyl n-butyral) resin R-43. The tan delta of resin R-42 was also nearly 18 percent higher than the tan delta of resin R-41, which included the same type and amount of plasticizer, but had a higher residual hydroxyl content than resin R-42.

Example 10: Tan Delta and Glass Transition Temperature of Poly(Vinyl Acetal) Resins Two poly(vinyl acetal) resins R-45 and R-46 were prepared according to the procedure described in Example 1. Both were prepared under identical conditions and both had residual hydroxyl contents of approximately 9.1 weight percent. However, resin R-45 was a poly(vinyl i-butyral) resin, formed using i-butyraldehyde, and resin R-46 was a poly(vinyl n-butyral), formed using n-butyraldehyde. Resin R-46 was mixed and melt blended with 3GEH plasticizer to produce a plasticized resin having a glass transition temperature of 2.23° C.

Several samples of resin R-45 were also mixed and melt blended with various amounts of 3GEH, but none exhibited a glass transition temperature of 2.23° C. To determine the amount of plasticizer required to achieve a glass transition temperature of 2.23° C. for resin R-45, the tan delta, glass transition temperature, and plasticizer content of each of the samples of R-45 were compiled into two graphs shown in FIGS. 6a and 6b. Using the relationships depicted in FIGS. 6a and 6b, it was calculated that a plasticizer content of 71 phr would provide a plasticized resin R-45 having a glass transition temperature of 2.23° C. Additionally, it was calculated with the graph shown in FIG. 6b that the resulting plasticized resin would have a tan delta of 1.45. Thus, for the same glass transition temperature, resins, such as resin R-45, that include residues of aldehydes other than n-butyraldehyde, require higher plasticizer loadings and exhibit higher glass transition temperatures than similar resins that only include residues of n-butyraldehyde.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. An interlayer comprising:
    a first resin layer comprising a first poly(vinyl acetal) resin and a first plasticizer; and
    a second resin layer adjacent to said first resin layer, wherein said second resin layer comprises a second poly(vinyl acetal) resin and a second plasticizer, wherein said second plasticizer is present in said second resin layer in an amount of at least 70 parts per hundred parts of resin (phr) and wherein the difference between the amount of said first plasticizer in said first resin layer and the amount of said second plasticizer in said second resin layer is more than 15 phr,
    wherein at least one of said first and said second poly(vinyl acetal) resins comprises at least 5 weight percent of residues of an aldehyde other than n-butyraldehyde, based on the total weight of aldehyde residues of said first or said second poly(vinyl acetal) resin, and
    wherein the glass transition temperature of said first resin layer is at least 3° C. higher than the glass transition temperature of said second resin layer, and wherein the absolute value of the difference between the refractive index of said first resin layer and the refractive index of said second resin layer is not more than 0.010; wherein the difference between the residual hydroxyl content of said first poly(vinyl acetal) resin and the residual hydroxyl content of said second poly(vinyl acetal) resin is at least 2 weight percent and wherein said interlayer has a haze value of less than 5 percent.

2. The interlayer of claim 1, wherein said at least one of said first and said second poly(vinyl acetal) resins comprises at least 50 weight percent of residues of an aldehyde other than n-butyraldehyde based on the total weight of aldehyde residues of said first poly(vinyl acetal) or said second poly(vinyl acetal) resin.

3. The interlayer of claim 1, wherein said aldehyde other than n-butyraldehyde is a $C_3$ to $C_{12}$ aliphatic aldehyde.

4. The interlayer of claim 1, wherein said interlayer meets at least one of the criteria (i) and (ii), below—
    (i) said first poly(vinyl acetal) resin has a residual hydroxyl content of at least 16 weight percent and a refractive index of not more than 1.485; and
    (ii) said second poly(vinyl acetal) resin has a glass transition temperature of not more than 75° C.

5. The interlayer of claim 1, wherein at least one of said first and said second plasticizer has a refractive index less than 1.460.

6. The interlayer of claim 1, wherein at least one of said first and said second resin layers comprises two plasticizers.

7. The interlayer of claim 1, wherein said first poly(vinyl acetal) resin comprises at least 5 weight percent of residues of i-butyraldehyde, based on the total weight of aldehyde residues of said first poly(vinyl acetal) resin, wherein said first poly(vinyl acetal) resin has a residual hydroxyl content in the range of from 16 to 20 weight percent, wherein said first plasticizer is present in said first resin layer in an amount of not more than 40 phr, and wherein said second poly(vinyl acetal) resin comprises at least 5 weight percent of n-butyraldehyde residues and has a residual hydroxyl content in the range of from 8 to 13 weight percent, wherein the difference in the glass transition temperature of said first resin layer and the glass transition temperature of said second resin layer is at least about 20° C.

8. The interlayer of claim 1, wherein said first plasticizer is present in said first resin layer in an amount of not more than 40 phr and wherein said first resin layer has a glass transition temperature of at least 30° C., wherein said second poly(vinyl acetal) resin has a residual hydroxyl content in the range of from 8 to 13 weight percent, and wherein the glass transition temperature of said second resin layer is not more than 10° C.

9. A multiple layer panel comprising said interlayer of claim 1 and at least one rigid substrate.

10. An interlayer comprising:
    a first resin layer comprising a first poly(vinyl acetal) resin and a first plasticizer; and
    a second resin layer adjacent to said first resin layer, wherein said second resin layer comprises a second poly(vinyl acetal) resin and a second plasticizer, wherein said second plasticizer is present in said second resin layer in an amount of at least 70 phr and wherein the difference between the amount of said first plasticizer in said first resin layer and the amount of said second plasticizer in said second resin layer is more than 15 phr, wherein said first poly(vinyl acetal) resin comprises at least 5 weight percent of residues of an aldehyde other than n-butyraldehyde, based on the total weight of aldehyde residues of said first poly(vinyl acetal) resin, wherein said first poly(vinyl acetal) resin has a residual hydroxyl content in the range of from 16 to 20 weight percent, wherein said first plasticizer is present in said first resin layer in an amount of not more than 40 phr, and wherein said second poly(vinyl acetal) resin comprises at least 5 weight percent of n-butyraldehyde residues and has a residual hydroxyl content in the range of from 8 to 13 weight percent, wherein the difference in the glass transition temperature of said first resin layer and the glass transition temperature of said second resin layer is at least about 20° C., and wherein the absolute value of the difference between the refractive index of said first resin layer and the refractive index of said second resin layer is not more than 0.010; wherein the difference between the residual hydroxyl content of said first poly(vinyl acetal) resin and the residual hydroxyl content of said second poly(vinyl acetal) resin is at least 2 weight percent and wherein said interlayer has a haze value of less than 5 percent.

11. The interlayer of claim 10, wherein said first poly(vinyl acetal) resins comprises at least 50 weight percent of residues of an aldehyde other than n-butyraldehyde based on the total weight of aldehyde residues of said first poly(vinyl acetal).

12. The interlayer of claim 10, wherein said aldehyde other than n-butyraldehyde is a $C_3$ to $C_{12}$ aliphatic aldehyde.

13. The interlayer of claim 10, wherein said interlayer meets at least one of the criteria (i) and (ii), below—
(i) said first poly(vinyl acetal) resin has a residual hydroxyl content of at least 16 weight percent and a refractive index of not more than 1.485; and
(ii) said second poly(vinyl acetal) resin has a glass transition temperature of not more than 75° C.

14. The interlayer of claim 10, wherein at least one of said first and said second plasticizer has a refractive index less than 1.460.

15. The interlayer of claim 10, wherein at least one of said first and said second resin layers comprises two plasticizers.

16. The interlayer of claim 10, wherein said aldehyde other than n-butyraldehyde is i-butyraldehyde.

17. The interlayer of claim 10, wherein said first plasticizer is present in said first resin layer in an amount of not more than 40 phr and wherein said first resin layer has a glass transition temperature of at least 30° C., wherein said second poly(vinyl acetal) resin has a residual hydroxyl content in the range of from 8 to 13 weight percent, and wherein the glass transition temperature of said second resin layer is not more than 10° C.

18. A multiple layer panel comprising said interlayer of claim 10 and at least one rigid substrate.

19. An interlayer comprising:
a first resin layer comprising a first poly(vinyl acetal) resin and a first plasticizer; and
a second resin layer adjacent to said first resin layer, wherein said second resin layer comprises a second poly(vinyl acetal) resin and a second plasticizer, wherein said second plasticizer is present in said second resin layer in an amount of at least 70 phr and wherein the difference between the amount of said first plasticizer in said first resin layer and the amount of said second plasticizer in said second resin layer is more than 15 phr,
wherein said first poly(vinyl acetal) resin comprises at least 5 weight percent of residues of i-butyraldehyde, based on the total weight of aldehyde residues of said first poly(vinyl acetal) resin, wherein said first poly(vinyl acetal) resin has a residual hydroxyl content in the range of from 16 to 20 weight percent, wherein said first plasticizer is present in said first resin layer in an amount of not more than 40 phr, and wherein said second poly(vinyl acetal) resin comprises at least 5 weight percent of n-butyraldehyde residues and has a residual hydroxyl content in the range of from 8 to 13 weight percent, wherein the difference in the glass transition temperature of said first resin layer and the glass transition temperature of said second resin layer is at least about 20° C., and wherein the absolute value of the difference between the refractive index of said first resin layer and the refractive index of said second resin layer is not more than 0.010; wherein the difference between the residual hydroxyl content of said first poly(vinyl acetal) resin and the residual hydroxyl content of said second poly(vinyl acetal) resin is at least 2 weight percent and wherein said interlayer has a haze value of less than 5 percent.

20. The interlayer of claim 19, wherein said first poly(vinyl acetal) resins comprises at least 50 weight percent of i-butyraldehyde based on the total weight of aldehyde residues of said first poly(vinyl acetal).

* * * * *